(12) United States Patent
Crittenden

(10) Patent No.: US 12,251,626 B2
(45) Date of Patent: Mar. 18, 2025

(54) THUMB ACTUATED GAMING CONTROLLER AND METHODS OF USE

(71) Applicant: Junk Food Custom Arcades, LLC., Alpharetta, GA (US)

(72) Inventor: Hardy Travis Crittenden, Cumming, GA (US)

(73) Assignee: Junk Food Custom Arcades, LLC., Alpharetta, GA (US)

( * ) Notice: Subject to any disclaimer, the term of this patent is extended or adjusted under 35 U.S.C. 154(b) by 0 days.

(21) Appl. No.: 18/745,870

(22) Filed: Jun. 17, 2024

(65) Prior Publication Data

US 2024/0416225 A1   Dec. 19, 2024

Related U.S. Application Data

(60) Provisional application No. 63/521,632, filed on Jun. 16, 2023.

(51) Int. Cl.
   *A63F 13/24*   (2014.01)

(52) U.S. Cl.
   CPC .................................. *A63F 13/24* (2014.09)

(58) Field of Classification Search
   CPC ........... A63F 13/24; A63F 13/06; G06F 3/016
   See application file for complete search history.

(56) References Cited

U.S. PATENT DOCUMENTS

| | | | |
|---|---|---|---|
| 5,923,317 A | 7/1999 | Sayler et al. | |
| 6,512,511 B2 * | 1/2003 | Willner | A63F 13/24 |
| | | | 348/E5.103 |
| 6,724,366 B2 * | 4/2004 | Crawford | G06F 3/03549 |
| | | | 345/157 |
| 7,580,728 B2 | 8/2009 | Vance et al. | |
| D715,362 S | 10/2014 | He | |
| D719,614 S | 12/2014 | Baum | |
| 10,035,063 B2 | 7/2018 | Hammontree et al. | |
| 10,722,787 B2 | 7/2020 | Huffer et al. | |
| 11,369,867 B2 | 6/2022 | Huffer et al. | |
| 11,826,640 B2 | 11/2023 | Huffer et al. | |
| 2006/0267928 A1 * | 11/2006 | Kawanobe | A63F 13/92 |
| | | | 345/156 |

(Continued)

*Primary Examiner* — Omkar A Deodhar
*Assistant Examiner* — Shauna-Kay N. Hall
(74) *Attorney, Agent, or Firm* — Richard C. Piercy, Esq.; Grell & Watson Patent Attorneys LLC

(57) ABSTRACT

A game controller component configured for controlling an electronic game. An improved thumb actuated user input enables greater performance, increases ergonomics, and offers a new tactile input option. The improved thumb actuated user input includes various components to make possible an input experience resembling a centering trackball, with physical user feedback further augmenting user performance. Other inputs may be featured at various other areas of the controller to further increase these capabilities. Placement of individual inputs may rely on certain human factors, such as natural hand placement over a desk surface or lap. As the user activates various input components, including the thumb actuator(s), data, messages, and instructions are provided to the computing device to cause electronic game movements or actions and users benefit from various arrangements by increasing their speed, comfort, and accuracy while decreasing fatigue and injury risk.

20 Claims, 18 Drawing Sheets

(56) References Cited

U.S. PATENT DOCUMENTS

| | | | |
|---|---|---|---|
| 2007/0060393 A1* | 3/2007 | Wu | A63F 13/24 |
| | | | 463/47 |
| 2007/0293318 A1* | 12/2007 | Tetterington | A63F 13/24 |
| | | | 463/37 |
| 2009/0054145 A1 | 2/2009 | Yang et al. | |
| 2014/0315642 A1* | 10/2014 | Grant | A63F 13/285 |
| | | | 345/184 |
| 2016/0361634 A1* | 12/2016 | Gassoway | G06F 3/0338 |
| 2021/0197080 A1* | 7/2021 | Su | A63F 13/24 |
| 2021/0252386 A1* | 8/2021 | VanWyk | A63F 13/24 |
| 2023/0330546 A1* | 10/2023 | Jolly | A63F 13/98 |
| 2024/0115936 A1 | 4/2024 | Huffer et al. | |

* cited by examiner

THUMB ACTUATED GAMING CONTROLLER AND METHODS OF USE

CROSS REFERENCE TO RELATED APPLICATIONS

To the full extent permitted by law, the present United States Non-provisional patent application hereby claims priority to and the full benefit of United States Provisional patent application entitled "Thumb Actuated Gaming Controller Improvement, User Configured Game Input Auditing, Performance Evaluation, and Oversight Systems and Devices, and Methods of Use Thereof," having assigned Ser. No. 63/521,632 filed on Jun. 16, 2023, which is incorporated by reference in its entirety.

FIELD OF THE DISCLOSURE

The present disclosure generally relates to computing and computer gaming peripherals. More specifically, the present disclosure is directed to a gaming input device and various configurations thereof.

The present disclosure is not limited to any game, console, computing technology or otherwise.

BACKGROUND OF THE DISCLOSURE

Competitive gaming, commonly referred to as "eSports", has become a globally popular activity. Competitors and enthusiasts alike come together either virtually or in special event space(s) to compete and observe competitive play of their favorite games. In a typical setup, a professional gamer operates a controller featuring a joystick, buttons, or other user input mechanisms, connected to a game console or computer to control action on a monitor screen. While each gaming platform has its own specific design, many modern gaming systems standardly utilize a joystick and push button handheld arrangement. Such standard arrangements may be optimized for a wide variety of gamers, including those young and old, experienced and inexperienced, as they are designed for a mass audience. However, the placement of buttons and the use of the joystick in these conventional designs are rarely optimized for the most efficient play, especially for highly skilled and experienced gamers, presenting significant challenges to professional gamers to adopt more appropriate arrangements, designs, and configuration. Such professional gamers, as they may be distinct from recreational or casual gamers, may require additional precision, speed, and comfort during extended gaming sessions. Since human anatomy is relatively homogenous with respect to hands, corresponding digits, and specialized dexterity among the digits, but possibly irrespective of their size, button, joystick, and other input positioning may be essential to the performance and stamina of professional gamers.

Given the diversity of available gaming consoles, computers, peripherals, games, and the gameplay itself, many professional and competitive amateurs have adopted specialized styles, strategies, and/or preferences with regard to user input devices, namely, gaming controller computer peripherals. This has led to many developments and improvements with respect to ergonomics, complexity, button numerosity, input precision, and speed, as well as other improvements. For example, with respect to ergonomics and controller comfort contoured grips, ergonomic shapes, rubberized grips, and layout improvements have improved the overall comfort during play and even stamina to perform over hours of interactive competitive gameplay. Complexities might include the addition and/or combination of joysticks and shoulder buttons/triggers to handheld devices, enabling precision thumb-control over movements for fighting and first-person movement and natural positioning for simulated actions, such as trigger pulls in first person shooting games. While preferences vary, digital inputs, such as touchpads, may be disfavored in some circumstances in favor of analog controls, such as analog joysticks and triggers, and other circumstances may demand or even require digital inputs. Incorporation of certain feedback mechanisms, such as clicking or haptic feedback assemblies, may often be incorporated into such digital/analog configurations to further increase customization, tactile live feedback, and performance.

Trackballs and mice may be favored by some users for their smooth and precise control, perhaps especially with PC gaming. Trackballs operate by using a rotatable ball housed within a socket that detects movement along two axes: X and Y. Movement may be detected through various known techniques, such as rollers or IR sensors. As the user rolls the ball with their fingers or palm, internal sensors track the ball's rotation and translate it into cursor movement or directional input on the screen. Trackballs normally allow for quick, 360-degree directional input with minimal hand movement, which can be particularly advantageous in certain gaming genres. Users may appreciate trackballs for their ergonomic benefits, as they reduce wrist strain and can be operated with a simple rolling motion of the fingers or palm. However, trackballs can also present challenges, such as difficulty in achieving rapid, repeated directional changes and the need for a clean, debris-free surface to maintain optimal performance. Additionally, many trackballs may require significant maintenance and cleaning, as an externally exposed component, the ball, may contact internal components, thereby depositing liquids or debris.

With respect to ergonomics, multiple additional advances and designs have led to the introduction of contoured and textured grips, ergonomic shapes, ergonomic input components, and ergonomic input positioning. Rubberized grips and textured surfaces often increase the ability for users to achieve higher levels of precision control over movements as well as tactile advances during perspiration or other slippery environments. With regard to shapes and designs, many ergonomic shapes have been introduced to better match natural hand positions such that users may not experience fatigue, cramping, or injury after prolonged and/or intense gaming sessions. Relatedly, the actual positioning of buttons, keys, touchpads, and joysticks/thumb sticks has further increased certain gamer performance and reduced gamer fatigue by strategically placing certain action/movement inputs beneath certain intended hand digits (e.g., left pinky, right thumb) such that digits are positioned to interact with action inputs appropriate to their dexterity and ability. For instance, as may be observed on any ordinary keyboard, thumbs, which may be positioned toward a center on a keyboard, both can strike a large commonly-used button. This near-universally adopted spacebar arrangement may properly utilize thumbs as they may lack the precision dexterity of other digits (e.g., index finger), but can easily perform repetitive actions with limited precision requirements. Alternatively, most users may report that the pinky may be similarly lacking in dexterity when compared to other digits, but since the pinky fingers also diverge at a natural hand positioning over a keyboard, their input at a keyboard may be usually limited to secondary inputs simultaneous to precision inputs. For example, when forming a capital letter on most keyboard configurations, a pinky may be recommended for pressing the "Shift" button, then when a letter is struck with another finger, a capital letter is input. Button positioning, with regard to increased computer gaming performance specifically, may be best exampled by certain "trigger" or "shoulder" buttons, which may appear nearly universally on handheld console gaming controls. Such buttons have been included to provide various actions and/or modifications to actions during gaming, and may naturally mimic the pull of a trigger on a gun or other weapon, leading to both more realistic gameplay in certain shooting games, as well as naturally positioning an input where a user's fingers would naturally lie on a gripped controller. Importantly, on such gripped controllers, many may additionally implement analog joysticks designed for thumb actuation, or other stick controls where a user's thumb may ordinarily appear when the controller is gripped. For example, standard controllers included with leading game system purchase each feature two such input sticks— one for each thumb when the controller is gripped by the user.

However, many gaming users, especially those who may play competitive fighting games, may prefer desktop, laptop, or other flat gaming surfaces. Such arrangements may generally seek to mimic classic arcade-style arrangements and may feature buttons, keycaps connected to PCBs, joysticks, touchpads, and other features atop a gaming surface. They may similarly be analogized to a keyboard, having a rectilinear shape that can be placed upon various surfaces and operated from behind and above. Such gaming surfaces of such flat controllers may be wildly diverse in arrangement, informed by ergonomics and actions linked to inputs that can increase gameplay speed capabilities for users. Some arrangements may be intentionally simplified to include only buttons, without more complicated inputs, and multiple buttons may replace a single joystick through various known controller modification techniques. Additionally, in some of these simplified arrangements, buttons may be placed in odd geometric arrangements to fit the natural size, shape, and digit specialization of user hands. Gaming surfaces having only buttons may be commonly known in the industry as "all-button" controllers. Traditional gaming controllers, particularly those designed for fighting games, often utilize a joystick for directional input alongside multiple buttons for various actions. This joystick method allegedly introduced several inefficiencies and ergonomic drawbacks, such as increased travel time for directional inputs and a higher likelihood of accidental inputs, which can hinder game performance. The claimed advantage of such all-button controllers may be that users have more deliberate control over their game and make fewer mistakes in a match. As it may relate to elimination of joysticks or directional pads (D-pads), random execution mistakes may also be significantly decreased when gamers use an entire hand for motions, rather than their wrist or thumb. Certain manufactures may even claim that user input can be naturally faster and reaction times can be improved by utilizing certain preferred buttons and/or keycaps. Finally, since these arrangements can be informed by user preferences, user handedness, and ergonomic science, other improvements to increasing performance and decreasing fatigue/injury are often claimed as features of such all-button controllers. However, such all-button arrangements may demand voluminous buttons, such that movements may be complicated during gaming and require large surfaces, which may be difficult to transport, carry, or hold.

Addressing these ergonomic inefficiencies without sacrificing user options with respect to action and movement inputs may be critical for further enhancing performance, comfort, and stamina in competitive gaming. The present disclosure introduces an improved controller design featuring an innovative thumb input component alongside various ergonomic keycap positioning and other features. The thumb input component may be designed to specifically leverage the anatomical properties of a thumb and its abilities when positioned atop a substantially flat gaming surface. Additionally, the overall design of this component with respect to the overall controller thereof may present a trackball-like interface, which may be familiar to experienced gamers while simultaneously presenting an entirely new mechanism of interaction. The controller assembly provided may also support significant customization and adaptability, catering to the diverse preferences and needs of professional gamers. The overall enhanced ergonomic design and functionality may increase many competitive gamers' performance, especially during competitive fighting gameplay. The instant disclosure may be further designed to address other aspects of the problems or needs discussed above by providing the specialized thumb input alongside other ergonomic design improvements. Such a controller may feature one, two, or more thumb input components, in addition to various buttons, keys, triggers, lights, touchpads, and other sensors/inputs.

SUMMARY OF THE DISCLOSURE

The present disclosure may solve the aforementioned limitations of the currently available gaming controllers by providing a plurality of user input components assembled in a manner which may be optimal to certain gaming styles or preferences. In one aspect, the present disclosure may relate to certain optimal conditions as it may relate to certain gaming styles and user preferences as may be described above and herein. In another aspect, the present disclosure may relate to an advanced gaming controller featuring innovative "thumb domes," designed to enhance user comfort and control precision. The thumb domes may replace traditional thumb sticks, joysticks, D-Pads, or other button/key arrangements in various controller arrangements. The thumb domes may further feature certain tactile properties, such has increased or reduced friction. In essence, the proposed thumb dome input may offer users an experience with similarities to both joysticks and trackballs such that the thumb dome may be pushed or flicked like a trackball, rather than held by the thumb like a thumb stick, and naturally returning to a center position, which may be distinct from the trackball and common to the thumb or joystick. This design may then utilize the side of the thumb for control, mimicking the motion of rolling a rubber ball with the thumb's side, thus offering an ergonomic alternative to conventional thumb sticks. By making such an improvement, design can be simplified over all-button arrangements, while increasing both ability and performance by preserving other fingers for other potentially specialized inputs and perhaps optimizing the thumbs' utility during play.

As it may relate to the thumb user input of the disclosure, in a potentially preferred embodiment, it may include a small Hall Effect joystick installed into a gaming controller circuit board at one end and protruding through the surface opposite the circuit board connection may be a specialized dome connected to the stick of the joystick. Additionally, the stick may be thickened and/or thinned through various improvements to the Hall Effect joystick in order to limit or increase the throw distance of the component. The surface may then further augment the design and inclusion of the thumb user input by featuring a partial enclosure of the dome atop the gaming surface. By including a thumb user input of the disclosure, various conventional joysticks, thumb sticks, multiple directional buttons, and D-Pads can be obviated while simultaneously offering a more ergonomic and comfortable experience. By leveraging the side of the thumb rather than its center, the design may mimic the natural motion of rolling a ball with the thumb's side, thereby reducing strain and improving control precision. By returning to center, functionality can be increased without requiring additional action by a gamer during gameplay, further augmenting gameplay performance. And by being positioned to protrude from beneath the gaming surface, certain benefits of a trackball experience may relate to both increased user enjoyment and decreased maintenance/cleaning requirements.

In such a preferred embodiment which may include a small and/or miniature Hall Effect joystick, such inclusion may offer significant benefits. Hall Effect joysticks, or joysticks using Hall-Effect technology, may be designed to overcome the limitations of traditional potentiometer-based joysticks. In a Hall-Effect joystick, the conventional conductive pin (or wiper) is replaced by a magnet, and the resistive contact strip is substituted with a flat conductor known as a Hall Element, which is sensitive to magnetic fields. As electrons flow through the Hall Element, the presence of a magnetic field pushes them to one side of the conductive material or the other, depending on the field's polarity. When the joystick is manipulated, the sensor detects the lateral displacement of electrons within the conductive material. This displacement is interpreted as movement without any physical contact between components, thus eliminating friction wear on the sensor. This contactless joystick input method may offer significant advantages, including a drastic increase in the lifespan of the controller and a substantial reduction in the likelihood of drift. Unlike potentiometer joysticks, which are susceptible to eventual failure due to wear and tear, a Hall-Effect joystick can potentially last the entire lifetime of the controller, providing a more durable and reliable solution for precise directional input.

Atop such a Hall Effect joystick, or other joystick as may be known to those having ordinary skill in the art, many controller manufactures have developed customized knobs, balls, domes, or other interactive physical tops. Such tops may feature a connection side and an exposed side, connecting the top to the stick of the joystick and allowing for enhanced user control, respectively. As it relates to a potentially preferred embodiment of the disclosure, the top may be domed and feature a stick connection on its interior side and user interactive features atop its exterior. This embodiment may include one component made of one material or many components made of many, but may optimally be constructed of a hard plastic interior dome connected to a rubberized exterior dome. Additionally, through a two-part molding process, consisting of a hard and lightweight inner shell enveloped by a textured, rubbery outer coating, this design may be further enhanced. The combination of materials therein may create a comfortable and wider contact area between the thumb and the analog control, leading to significant ergonomic improvements. The design may further allow for approximately a 40% reduction in the travel distance needed for side-to-side movements while maintaining high precision due to the wider, continuous contact area of the rubberized dome.

As it further relates to the domes of the joystick configuration, the overall controller design and placement of joystick assembly may emphasize user comfort, ergonomics, and performance. The layout, shapes, contours, and resting position of the hands and thumbs as it relates to the design of the assembly, which may be demanded by other inputs of the assembly, may be akin to those of an ergonomic keyboard. Hence, adjustments may be made to pivot the hand into a more natural resting posture. Custom spring rates, key sizes, key arrangements, and other tailored features can then ensure proper actuation of the various analog and digital controls. Importantly, further customization of certain standard joystick assemblies, which may be readily and affordably obtained, may accomplish further performance and user experience benefits. For example, many Hall Effect joysticks and other types of joysticks may be standardly configured to achieve a maximum travel, which may result in a non-circular oscillation when "spun" by a user's thumb or finger. Often the cause of such non-circular travel is a non-cylindrical shape of a joystick stem. Such non-cylindrical shapes may offer certain structural and connection benefits. Previous attempts to create a circular path at the maxima from center may have required installation of a ring or surround, limiting the travel distance to a circle at the exterior. An aspect of the disclosed thumb actuator improvement installs an inner sleeve around the stem, enabling the maximum circular travel via an alternative novel construction.

At the connection end of the joystick, as well as at the connection end of other input components, may be one or more printed control board(s) or PCB(s). Such PCBs may be custom or standard PCBs, which may offer certain functionality, durability, and performance improvements, as may be known by those having ordinary skill in the art. Such PCBs may function independently or together to receive physical inputs from the physical input controls of the controller assembly and transmit them to a gaming console or computing device via known configurations (e.g., BLUETOOTH®, USB). PCB(s) may accept analog and/or digital control input device connections, which may include both physical secure snap-type or other physical connections as well as electrical connections. Power to the PCB(s) and other components of the disclosed controllers and devices may be obtained via a power source, such as a power adapter or battery, which may be connected by a power cord (e.g., USB) or inductive charging device via a power supply, and may have capabilities to power downstream and/or add on devices. The PCB itself, or multiple PCBs themselves, may be physically sandwiched between a top case and a bottom case of a controller assembly. Additionally, it/they may be secured thereto either the top case, bottom case, or both via known connection mechanisms. In such configurations, keys, buttons, and other input assemblies may be disconnected and/or removed either by removing one case and detaching therefrom a PCB, or in certain configurations by removing the input assembly through an opening of the gaming surface or top case. Such configurations may enable user repair, cleaning, and further customization through swapping compatible components on the PCB(s).

In some embodiments, the controller may additionally allow for certain functional, rather than mechanical or physical customizations. As may be well understood in the art, functions and customization options thereof for a controller assembly may extend beyond hardware alone and may include certain software capabilities. Such software customization may require additional computer hardware, such as memory, processing, and storage such that it can receive and execute computer instructions (i.e., software).

Then, users may be enabled to achieve certain custom behavior and/or interactive features such as changing lighting settings, remapping controls via a web or phone app, and storing or sharing profiles for various games online or between devices. Other example custom configurations may include disabling certain controls, if desired, and custom press or input settings, such as latching an analog control in a forward direction for RPGs, freeing the thumb for other actions.

Overall, the controller assembly of the disclosure may be designed to appeal to both competitive and casual gamers, with potential applications beyond fighting games. Accordingly, in one aspect, the present disclosure embraces the simplicity that may be achieved through dual-thumb actuated stick inputs alongside other gaming input mechanisms. In other aspects, complications, such as ergonomic or performance shapes, designs, and accessory configurations may further enhance overall user experience without seriously interfering with the simplicity of the assembly of the disclosure. These may include but are not limited to accessory clips, cord managers, light(s), speaker(s), mic(s), display(s), the like and/or combinations thereof.

However, it should also be understood that the present disclosure is not limited to any specific configuration as may be specifically described herein. Various modifications and alternative embodiments can be implemented without departing from the scope of the disclosure. For example, different styles of domes can be used, allowing for variations in the tactile feedback and activation force required. Keypresses of the disclosed assembly may be accomplished by users by employing buttons, switches or any other type of sensor, providing flexibility in design and functionality. In some embodiments, a stick-shaped outer extension of the dome could be inserted in place of the dome described herein, offering an alternative method of input. Additionally, the dome may feature certain textures or tactile features of the dome, where, for example a center divot included proximate the center of the dome could provide another option to further enable custom user interaction and preferences. As may be well understood by those having ordinary skill in the art, analog or digital substitutions may be made for both the Hall Effect joystick assembly as well as any other input device of the assembly, additionally enhancing the versatility of the input device. Furthermore, additional controls and sensors can be added to the input device, or the device may function with other compatible devices and/or accessories, further expanding its capabilities and potential applications. These modifications may combine to ensure that the device can be customized and optimized for various use cases and user requirements. By incorporating these as well as other alternative embodiments and modifications, the device of the disclosure can maintain certain core functionality and improvement over prior art devices, while additionally offering more flexibility and adaptability for its users.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-10, in describing the exemplary embodiments of the present disclosure, specific terminology may be employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

The present disclosure solves the aforementioned limitations of the currently available devices and methods of providing a thumb actuated gaming input. Referring generally to FIGS. 1-10, therein illustrated are various embodiments, uses, combinations, and accessories of the thumb actuated gaming controller input, various embodiments of controllers thereof, and methods of use thereof. As may be understood by those having ordinary skill in the art, various terms may be used interchangeably herein. By way of example and not limitation, input devices of controllers may be broadly understood to include both input and feedback, which may include buttons, thumbsticks/joysticks, D-pads, touchpads, triggers, bumpers, motion sensors, force feedback/haptic feedback mechanisms, paddle buttons, audio controls, programmable buttons, LED indicators, mics, speakers, accessory ports, the like, and/or combinations thereof, which may be interchangeably used herein and within the various configurations of various embodiments of the improved controller designs as described herein. While many of the Drawings described herein may be proportional to a potentially preferred embodiment and variations thereof, they may not be drawn exactly to scale and those having ordinary skill in the art may adjust various shapes/sizes to accomplish intended results. While variations to certain buttons, keys, lights, etc. may be found throughout the drawings, all variations of controllers which include the improved thumb actuator of the disclosure may be referred to throughout as controller assembly 300 or simply controller 300.

Figure 1A:
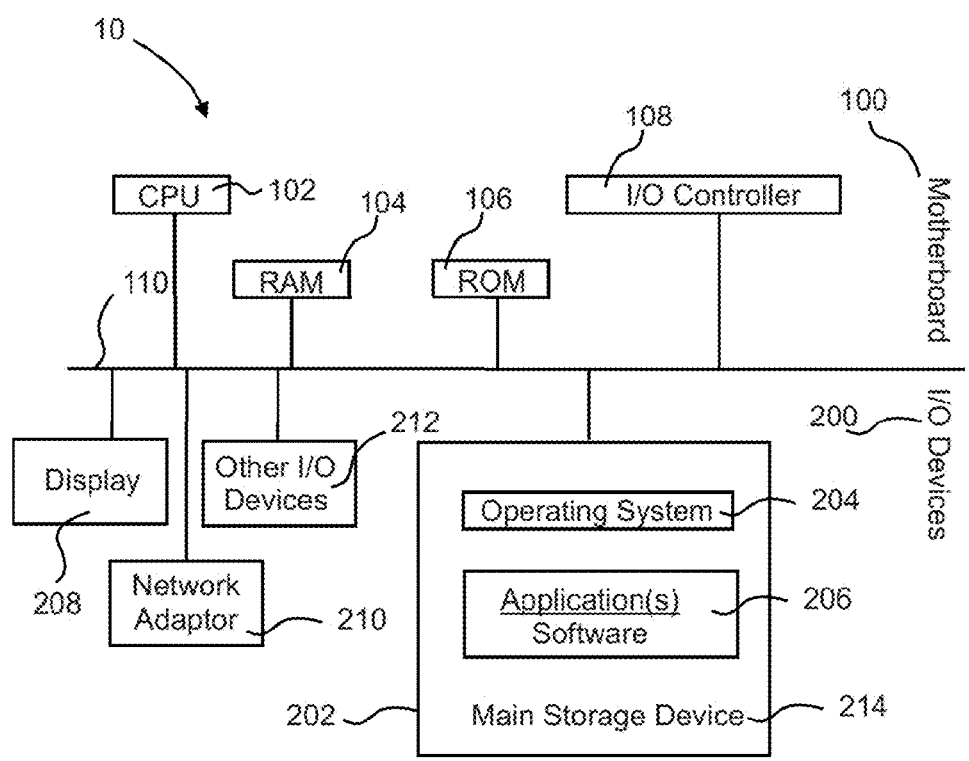
FIG. 1A-D are a block diagrams of computer system(s), digital communications system(s), gaming controller(s), and audiovisual entertainment system(s) of the disclosure.
Figure 1B:
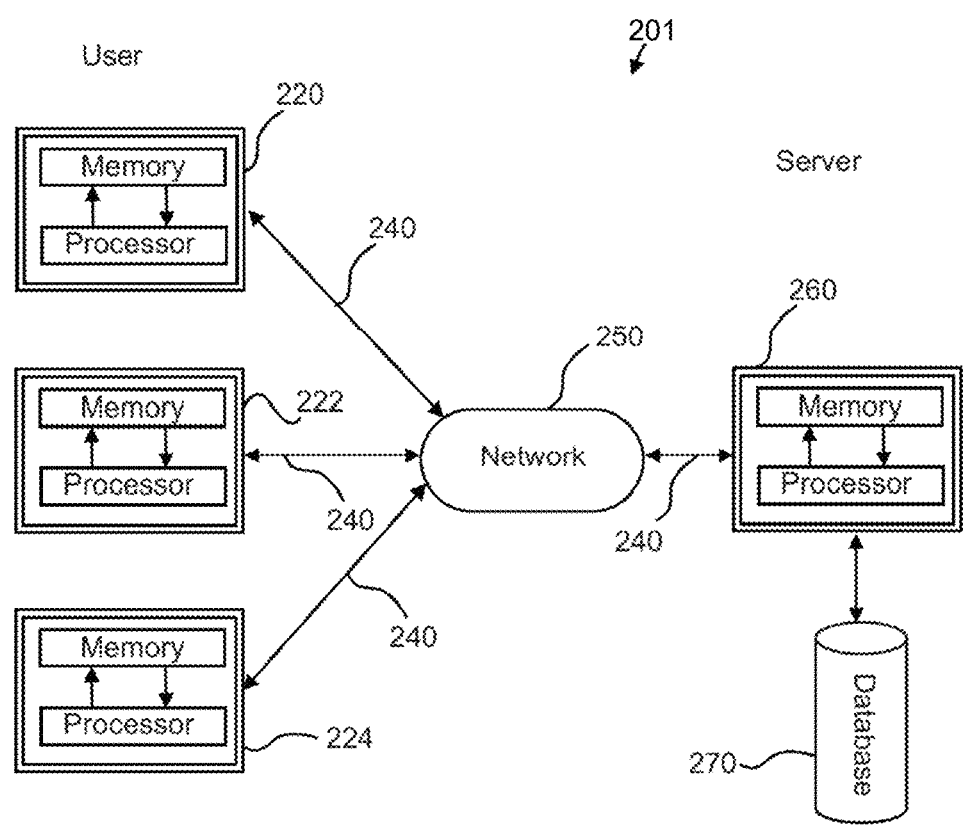
Figure 1C:
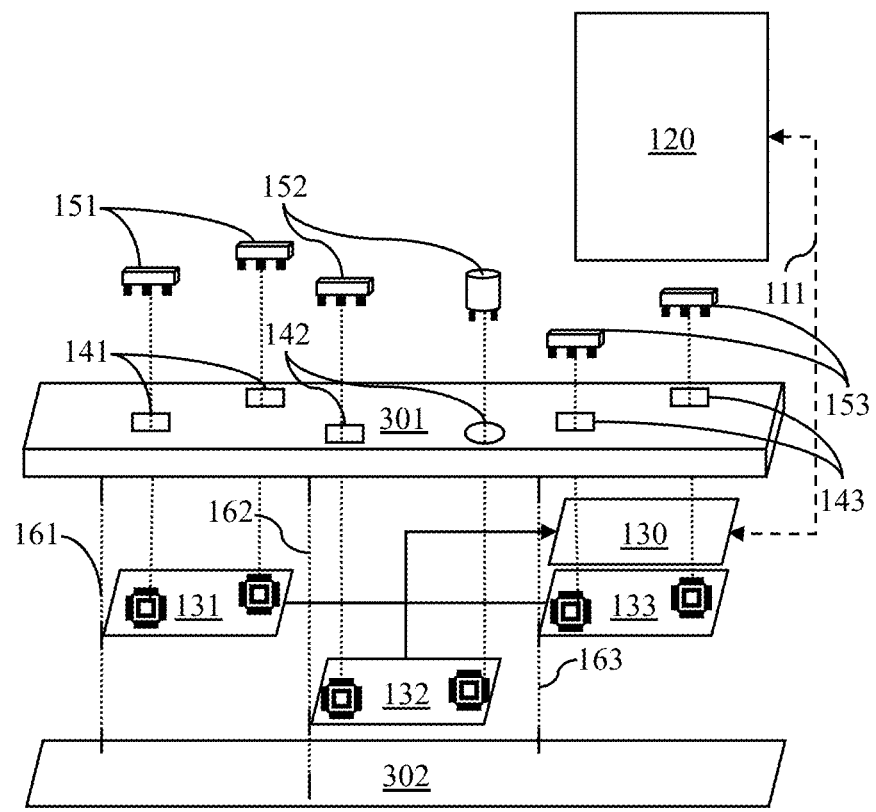

Turning now to FIGS. 1A-1D, various features of computers, networks, gaming entertainment systems, and controllers thereof are therein illustrated. In describing the exemplary embodiments of the present disclosure, namely those as illustrated in FIGS. 1A-1C, specific terminology is employed for the sake of clarity. The present disclosure, however, is not intended to be limited to the specific terminology so selected, and it is to be understood that each specific element includes all technical equivalents that operate in a similar manner to accomplish similar functions. The claimed disclosure may, however, be embodied in many different forms and should not be construed to be limited to the embodiments set forth herein. The examples set forth herein are non-limiting examples, and are merely examples among other possible examples.

As will be appreciated by one of skill in the art, in at least one aspect, the present disclosure may be embodied as a method, data processing and/or output system, or computer program product which may be installed on a controller or other computing device of the disclosure. Additionally, many of the devices of the disclosure may feature one or more computing devices and/or variations thereof as may be generally, not specifically, illustrated and described, at least with respect to FIGS. 1A-1D, and the related description thereof. Accordingly, the present disclosure may take the form of an entirely hardware embodiment, entirely software embodiment or an embodiment combining software and hardware aspects. Additionally, various components and sub-components may be arranged into a single assembly or may be connected into a network of computing devices as may be generally described herein. Furthermore, in at least certain aspects, the present disclosure may take the form of a computer program product on a computer-readable storage medium having computer-readable program code means embodied in the medium. Any suitable computer readable medium may be utilized, including hard disks, ROM, RAM, CD-ROMs, electrical, optical, magnetic storage devices and the like.

With respect to certain computerized features of the gaming controller as herein described, the present disclosure is described below with reference to flowchart illustrations of methods, apparatus (systems) and computer program products according to embodiments of the present disclosure. It will be understood that each block or step of a flowchart illustration, and combinations of blocks or steps in the flowchart illustrations, can be implemented by computer program instructions or operations. These computer program instructions or operations may be loaded onto a general-purpose computer, special purpose computer, or other programmable data processing apparatus to produce a machine, such that the instructions or operations, which execute on the computer or other programmable data processing apparatus, create means for implementing the functions specified in the flowchart block or blocks/step or steps.

As it may be related to the controller of the disclosure or devices connected physically or wirelessly thereto, these computer program instructions or operations may also be stored in a computer-usable memory that can direct a computer or other programmable data processing apparatus to function in a particular manner, such that the instructions or operations stored in the computer-usable memory produce an article of manufacture including instruction means which implement the function specified in the flowchart block or blocks/step or steps. The computer program instructions or operations may also be loaded onto a computer or other programmable data processing apparatus (processor) to cause a series of operational steps to be performed on the computer or other programmable apparatus (processor) to produce a computer implemented process such that the instructions or operations which execute on the computer or other programmable apparatus (processor) provide steps for implementing the functions specified in the flowchart block or blocks/step or steps. Accordingly, blocks or steps of the flowchart illustrations support combinations of means for performing the specified functions, combinations of steps for performing the specified functions, and program instruction means for performing the specified functions. It should also be understood that each block or step of the flowchart illustrations, and combinations of blocks or steps in the flowchart illustrations, can be implemented by special purpose hardware-based computer systems, which perform the specified functions or steps, or combinations of special purpose hardware and computer instructions or operations. Computer programming for implementing the present disclosure may be written in various programming languages, database languages, and the like. However, it is understood that other source or object-oriented programming languages, and other conventional programming language may be utilized without departing from the spirit and intent of the present disclosure.

Referring now specifically to FIG. 1A, there is illustrated a block diagram of a computing system 10 that provides a suitable environment for implementing embodiments of the present disclosure. The computer architecture shown in FIG. 1A is divided into two parts-motherboard 100 and the input/output (I/O) devices 200. Motherboard 100 preferably includes subsystems and/or processor(s) to execute instructions such as central processing unit (CPU) 102, a memory device, such as random-access memory (RAM) 104, input/output (I/O) controller 108, and a memory device such as read-only memory (ROM) 106, also known as firmware, which are interconnected by bus 110. A basic input output system (BIOS) containing the basic routines that help to transfer information between elements within the subsystems of the computer is preferably stored in ROM 106, or operably disposed in RAM 104. Computing system 10 further preferably includes I/O devices 202, such as main storage device 214 for storing operating system 204 and instructions or application program(s) 206, and display 208 for visual output, and other I/O devices 212 as appropriate. Main storage device 214 preferably is connected to CPU 102 through a main storage controller (represented as 108) connected to bus 110. Network adapter 210 allows the computer system to send and receive data through communication devices or any other network adapter capable of transmitting and receiving data over a communications link that is either a wired, optical, or wireless data pathway. It is recognized herein that central processing unit (CPU) 102 performs instructions, operations or commands stored in ROM 106 or RAM 104. Processor 102 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1A as a single processor, in some embodiments, processor 102 comprises a plurality of processors. The plurality of processors may be embodied on a single computing device or may be distributed across a plurality of computing devices collectively configured to function as the computing device 10. The plurality of processors may be in operative communication with each other and may be collectively configured to perform one or more functionalities of the computing device 10 as described herein. In an example embodiment, processor 102 is configured to execute instructions stored in memory 104, 106 or otherwise accessible to processor 102. These instructions, when executed by processor 102, may cause the computing device 10 to perform one or more of the functionalities of the computing device 10 as described herein.

Whether configured by hardware, firmware/software methods, or by a combination thereof, processor 102 may comprise an entity capable of performing operations according to embodiments of the present invention while configured accordingly. Thus, for example, when processor 102 is embodied as an ASIC, FPGA or the like, processor 102 may comprise specifically configured hardware for conducting one or more operations described herein. As another example, when processor 102 is embodied as an executor of instructions, such as may be stored in memory 104, 106, the instructions may specifically configure processor 102 to perform one or more algorithms and operations described herein. The plurality of memory components 104, 106 may be embodied on a single computing device 10 or distributed across a plurality of computing devices. In various embodiments, memory may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 104, 106 may be configured to store information, data, applications, instructions, or the like for enabling the computing device 10 to carry out various functions in accordance with example embodiments discussed herein. For example, in at least some embodiments, memory 104, 106 is configured to buffer input data for processing by processor 102. Additionally or alternatively, in at least some embodiments, memory 104, 106 may be configured to store program instructions for execution by processor 102. Memory 104, 106 may store information in the form of static and/or dynamic information. This stored information may be stored and/or used by the computing device 10 during the course of performing its functionalities.

Many other devices or subsystems or other I/O devices 212 may be connected in a similar manner, including but not limited to, devices such as microphone, speakers, flash drive, CD-ROM player, DVD player, printer, main storage device 214, such as hard drive, and/or modem each connected via an I/O adapter. Additionally, the I/O devices 212 themselves may contain some or all of the components and configurations as may be herein described, namely controller 300. Also, although preferred, it is not necessary for all of the devices shown in FIG. 1A to be present to practice the present disclosure, as discussed below. Furthermore, the devices and subsystems may be interconnected in different configurations from that shown in FIG. 1A, or may be based on optical or gate arrays, or some combination of these elements that is capable of responding to and executing instructions or operations. The operation of a computer system such as that shown in FIG. 1A is readily known in the art and is not discussed in further detail in this application, so as not to overcomplicate the present discussion.

In some embodiments, some or all of the functionality or steps may be performed by processor 102. In this regard, the example processes and algorithms discussed herein can be performed by at least one processor 102. For example, non-transitory computer readable storage media can be configured to store firmware, one or more application programs, and/or other software, which include instructions and other computer-readable program code portions that can be executed to control processors of the components of system 201 to implement various operations, including the examples shown above. As such, a series of computer-readable program code portions may be embodied in one or more computer program products and can be used, with a computing device, server, and/or other programmable apparatus, to produce the machine-implemented processes discussed herein. Any such computer program instructions and/or other type of code may be loaded onto a computer, processor or other programmable apparatuses circuitry to produce a machine, such that the computer, processor or other programmable circuitry that executes the code may be the means for implementing various functions, including those described herein.

Referring now to FIG. 1B, there is illustrated a diagram depicting an exemplary system 201 in which concepts consistent with the present disclosure may be implemented or performed. Examples of each element within the communication system 201 of FIG. 1B are broadly described above with respect to FIG. 1A. In particular, the server system 260 and user system 220 have attributes similar to computer system 10 of FIG. 1A and illustrate one possible implementation of computer system 10. Communication system 201 preferably includes one or more user systems 220, 222, 224, one or more server system 260, and network 250, which could be, for example, the Internet, public network, private network or cloud. User systems 220-224 each preferably include a computer-readable medium, such as random access memory, coupled to a processor. The processor, CPU 102, executes program instructions or operations stored in memory. Communication system 201 typically includes one or more user system 220. For example, user system 220 may include one or more general-purpose computers (e.g., personal computers), one or more special purpose computers (e.g., devices specifically programmed to communicate with each other and/or the server system 260), a workstation, a server, a device, a digital assistant or a "smart" cellular telephone or pager, a digital camera, a component, other equipment, or some combination of these elements that is capable of responding to and executing instructions or operations.

Similar to user system 220, server system 260 preferably includes a computer-readable medium, such as random-access memory, coupled to a processor. The processor executes program instructions stored in memory. Server system 260 may also include a number of additional external or internal devices, such as, without limitation, a mouse, a CD-ROM, a keyboard, a display, a storage device and other attributes similar to computer system 10 of FIG. 1A. Server system 260 may additionally include a secondary storage element, such as database 270 for storage of data and information. Server system 260, although depicted as a single computer system, may be implemented as a network of computer processors. Memory in server system 260 contains one or more executable steps, program(s), algorithm(s), or application(s) 206 (shown in FIG. 1). For example, the server system 260 may include a web server, information server, application server, one or more general-purpose computers (e.g., personal computers), one or more special purpose computers (e.g., devices specifically programmed to communicate with each other), a workstation or other equipment, or some combination of these elements that is capable of responding to and executing instructions or operations.

System 201 is capable of delivering and exchanging data between user system 220 and a server system 260 through communications link 240 and/or network 250. Through user system 220, users can preferably communicate over network 250 with each other user system 220, 222, 224, and with other systems and devices, such as server system 260, to electronically transmit, store, manipulate, and/or otherwise use data exchanged between the user system and the server system. Communications link 240 typically includes network 250 making a direct or indirect communication between the user system 220 and the server system 260, irrespective of physical separation. Examples of a network 250 include the Internet, cloud, analog or digital wired and wireless networks, radio, television, cable, satellite, and/or any other delivery mechanism for carrying and/or transmitting data or other information, such as to electronically transmit, store, manipulate, and/or otherwise modify data exchanged between the user system and the server system. The communications link 240 may include, for example, a wired, wireless, cable, optical or satellite communication system or other pathway. It is contemplated herein that RAM 104, main storage device 214, and database 270 may be referred to herein as storage device(s) or memory device(s).

Referring specifically to FIG. 1C, illustrated therein is a block diagram of an exemplary embodiment of a disassembled controller assembly 300 to show the various basic parts and features thereof, absent certain design considerations. In essence, many modern consumer electronics products may feature similar assemblies, which may include generally a top casing, bottom casing, and internal circuitry, namely, as may be the case for controller assembly 300, controller top casing 301, controller bottom casing 302, controller interface connection 130, and circuit boards 131, 132, 133. Each of circuit boards 131, 132, 133 may feature various inputs, which may be grouped through various known ways by those having ordinary skill in the art, but may specifically include in certain possibly preferred embodiments at least left input assemblage 151, central input assemblage 152, and right input assemblage 153. Then, various openings, apertures, and/or holes may exist on either or both of controller top casing 301 and controller bottom casing 302 to enable access to input assemblages installed thereon circuit boards internal to controller assembly 300. Such openings may include left gaming surface opening assemblage 141, central gaming surface opening assemblage 142, and right gaming surface opening assemblage 143 as may be illustrated in FIG. 1C. Such input assemblages 151, 152, and 153 may form, via their constituent parts, physical and/or electronic connections thereto the respective circuit boards 131, 132, 133, respectively. Then, controller assembly 300 may be assembled using left assembly connection 161, central assembly connection 162, right assembly connection 163, which may be formed through the device using known techniques, such as adhesives, through holes, bolts, screws, the like and/or combinations thereof. Importantly, assembly connections 161 may instead be formed only between the circuitry and a single casing, either, or both, and various tradeoffs related to durability, cost to manufacture, and overall quality may exist, given such considerations. Controller interface connection 130, having connections to various circuitry of the device, which may be connected to various input devices, then may form a means to interoperate with gaming entertainment system 120, which may be covered in greater detail below. Additionally, it should be understood by those having skill in the art that each of controller top casing 301 and controller bottom casing 302 may be formed of one part or many, which may in turn be permanently attached and/or fused to produce a unitary device, which may be sealed from certain environmental hazards, such as water intrusion, dust intrusion, and the like. While certain openings may exist, other techniques to seal controller assembly 300 may be from external environment(s). With respect then to the basic operational properties of controller assembly 300, including its relation to computer, networking, and manufacturing technology, other considerations such as design may be further important to overall function and/or performance of controller assembly 300, which may be further observed throughout the remainder of the Detailed Description herein.

Figure 1D:
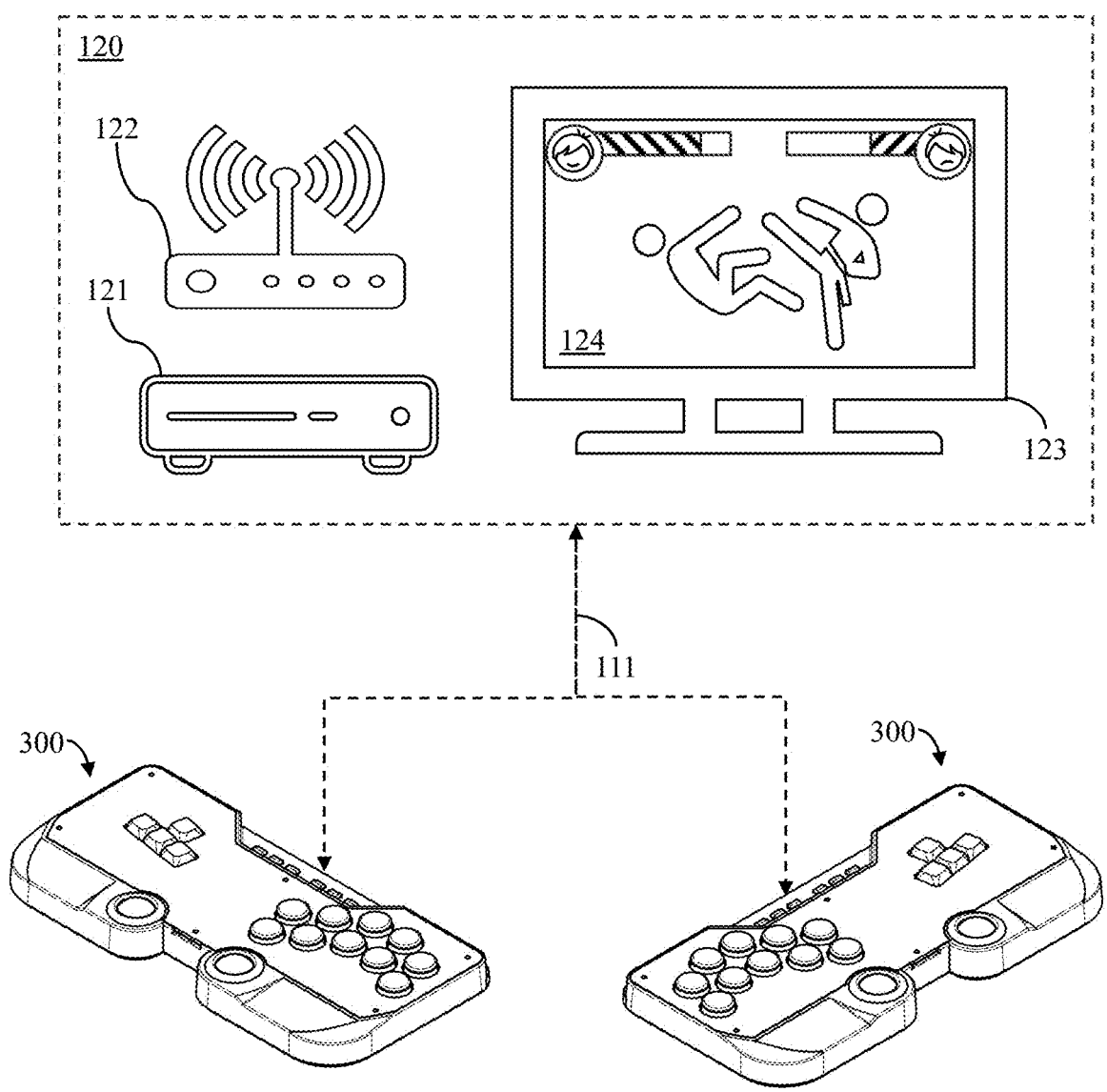

Turning to FIG. 1D, therein illustrated is a block diagram of gaming entertainment system 120, including perspective drawings of an exemplary controller 300 and interaction therebetween. As may be relevant to FIG. 1A, gaming console 121 may be comprised of various computing parts as may be covered in detail therein. Gaming console 121 may be a specialized electronic gaming device or a computing device configured to perform instructions that enable gameplay. Gaming console 121 may be connected to network gateway 122, which may be a modem, router, switch, or other network component that may enable gaming console 121 to connect with other computing devices and gaming consoles to enable gameplay and/or communication thereof via a local network or the Internet. Gaming console 121 may have a further connection to television 123, which may display user interface (UI) 124 during gameplay. As may be appreciated and thoroughly recognized by those having ordinary skill in the art, components of gaming entertainment system 120 may be separate or combined, which may enable certain portability and/or convenience over a traditional television arrangement. Additionally, while gaming via televisions may be common, as used herein television 123 may be any display capable of displaying a UI. Then, a final connection between gaming entertainment system 120 and controller assembly 300, which may be a direct physical wire connection with gaming console 121 or any other known or possible means for transmitting data and/or power over a distance. Importantly, controller assembly 300 may be designed to be placed on a desk and/or lap, some distance from television 123 such that certain comfort and UI legibility can be achieved.

Figure 2A:
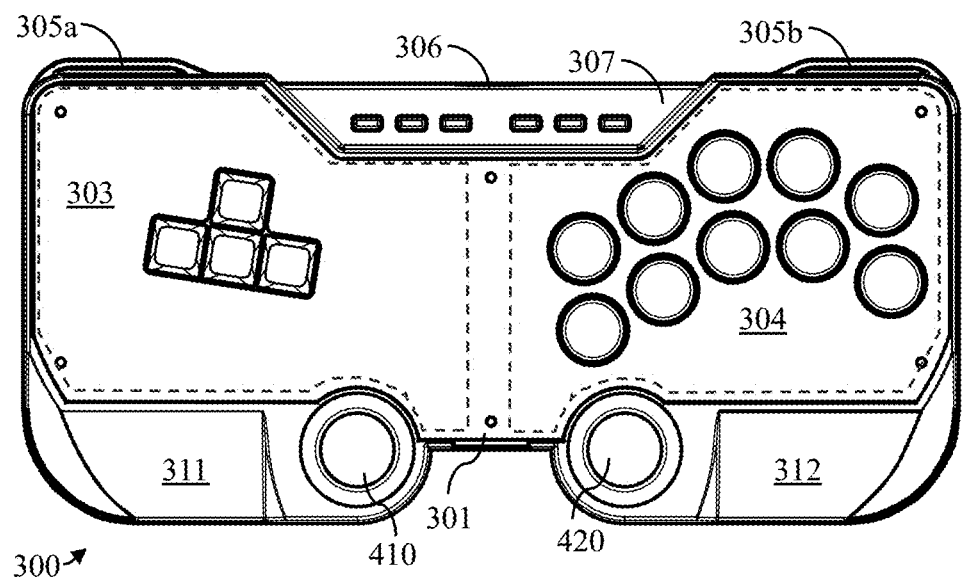
FIGS. 2A-B are top and bottom plan views of the exemplary controller of the disclosure, respectively, showing certain features of an exemplary design.
Figure 2B:
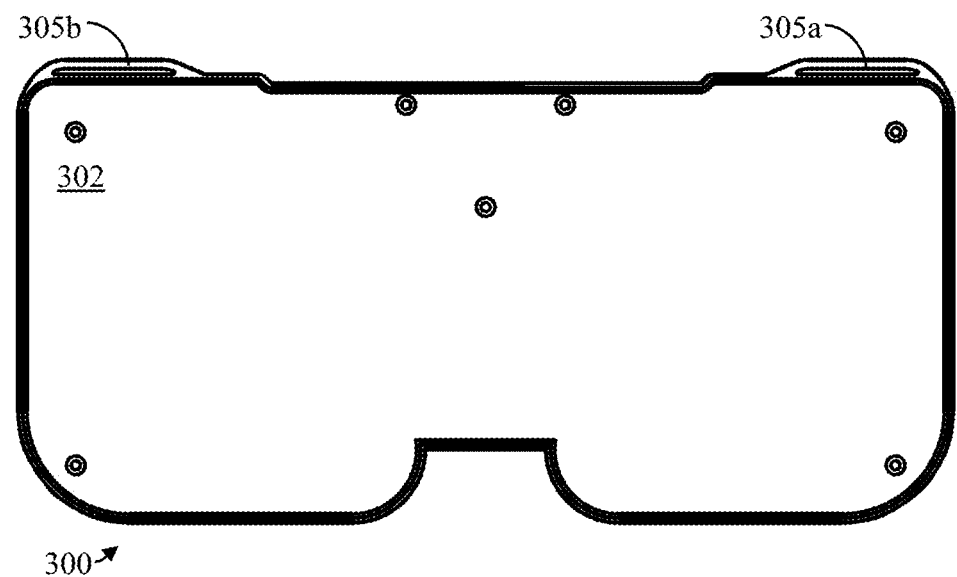

Turning now to FIGS. 2A-B, illustrated therein are top and bottom plan views of controller assembly 300, respectively, showing certain exterior parts and features of an exemplary design thereof. Starting with FIG. 2A, the top plan view is illustrated. Broadly, controller assembly 300 may feature at this top surface controller top casing 301, which may have a plurality of openings thereof to enable left hand surface 303 and right hand surface 304 user inputs to protrude therefrom, as well as openings for left thumb actuator assembly 410 and right thumb actuator assembly 420. Other openings may exist thereon controller top casing 301, which may include those proximate auxiliary input/feedback panel 307 for various lights, sensors, other communication or indication features, and/or inputs. Additionally, openings may be made for structural and/or connection mechanisms, such as screws to form assembly connections 161-3, additional assembly connections, as well as connections to other objects/devices, such as wired connection 306 and/or right and left accessory clips 305a-b. Right and left accessory clips 305a-b may be used for such tasks as wire management, clipping and/or securing to a bag or organizational item, a lock, a means for carrying controller assembly 300, the like and/or combinations thereof. In use, a user may place his or her left hand above left hand surface 303, his or her right hand above right hand surface 304, such that keys thereof left hand surface 303 and left thumb actuator assembly 410 may be operated via the fingers and thumb, respectively, of his or her left hand. The same can be performed using his or her right hand over right hand surface 304 in order for fingers thereof to operate keys and other inputs thereof right hand surface 304 and for the thumb thereof the left hand to operate right thumb actuator assembly 420. While controller top casing 301 may be largely rectilinear and/or flat, various contours of controller top casing 301 and controller assembly 300 may be informed by aesthetics, practicality, user preference, and/or ergonomics. For instance, as illustrated, controller top casing 301 may feature one or more wrist rest, such as left wrist rest 311 and right wrist rest 312, and may further include various contours covered further in the disclosure as it may relate to design considerations, covered in greater detail with respect to FIGS. 10A-G. Turning to FIG. 2B, controller bottom casing 302 can be observed in a potentially preferred embodiment and the underside of right and left accessory clips 305a-b may be visible. As was the case with controller top casing 301, controller bottom casing 302 may also feature various openings to form connections with circuitry and/or controller bottom casing 302, as well as other optional openings to expose protruding inputs and/or feedback devices, to provide an opening for cooling and/or accessing internal components of controller assembly 300, or for any other reason an opening may be provided on controller assembly 300 at the underside, namely controller bottom casing 302.

Figure 3A:
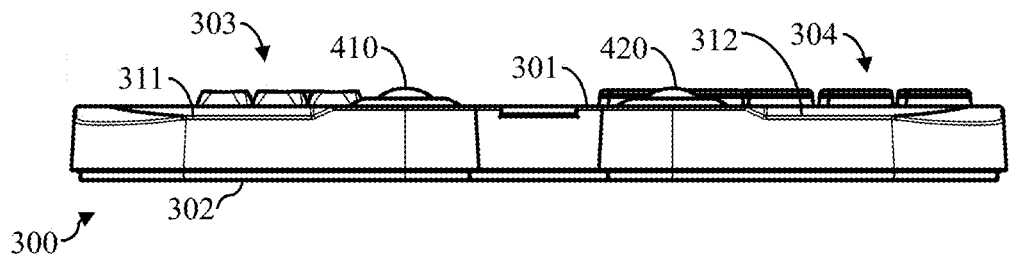
FIGS. 3A-D are rear, front, left, and right elevation views thereof, respectively.
Figure 3B:
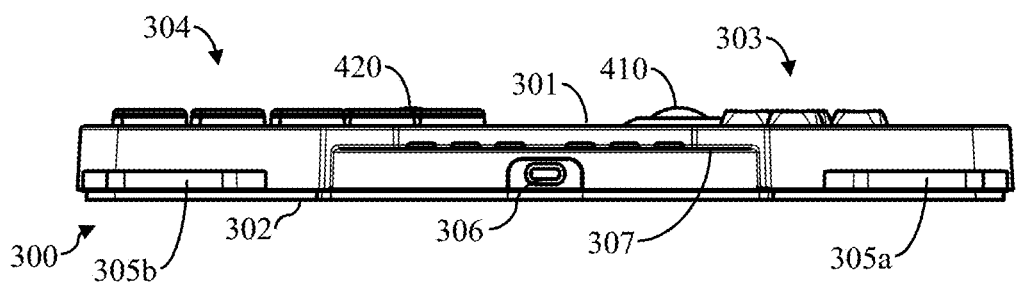
Figures 3C, 3D:
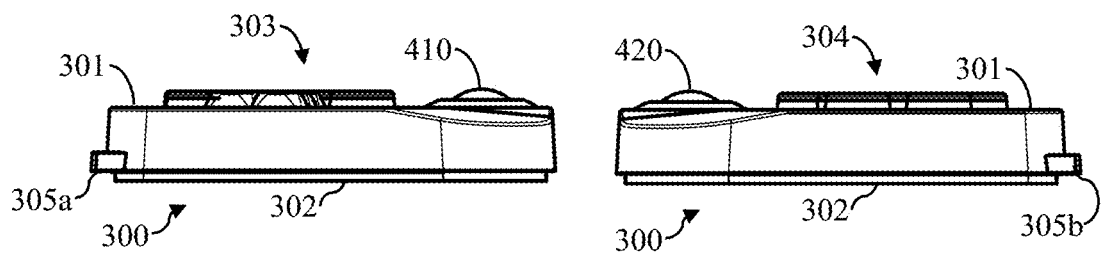

Turning now to FIGS. 3A-D, illustrated therein are rear, front, left, and right elevation views of controller assembly 300, respectively. Starting at FIG. 3A, or the rear elevation view, some features of controller assembly 300 can be observed in further detail. Importantly, this view may be most closely approximated by obtaining controller assembly 300, placing it on a desk, and sitting at the desk to observe controller assembly 300 from a playing position. Specifically at this angle, left wrist rest 311 and right wrist rest 312 can be observed to be slightly slanted down from controller top casing 301 to form wrist resting channels and left thumb actuator assembly 410 and right thumb actuator assembly 420 can be better observed as it may relate to some of its design and/or operation. Additionally, left hand surface 303 and right hand surface 304 can be observed to contain protruding inputs via the openings thereof, which may be connected to internal circuitry, both physically and electrically, in order to cause controller assembly 300 to function, see e.g., FIG. 1C. As it may relate to left thumb actuator assembly 410 and right thumb actuator assembly 420 from this view, thumb actuator assemblies 410, 420 may be observed to similarly protrude from controller top casing 301 in an enclosed dome arrangement such that controller top casing 301 may rise slightly or contain a ring or other component having an opening and thickness to partially meet thumbstick surround 413 and form a stepped-dome configuration on the surface of controller assembly 300. Given that left thumb actuator assembly 410 and right thumb actuator assembly 420 are illustrated in this embodiment to appear centrally on controller assembly 300 such that certain human anatomical features, namely the thumbs, can easily access left thumb actuator assembly 410 and/or right thumb actuator assembly 420 during gameplay. When turned 180° to observe the front of controller assembly 300 at an elevation, other features can be further observed. Importantly, though left thumb actuator assembly 410 may be visible from this angle in this embodiment, the disclosure is not so limited and certain assembly variations of controller assembly 300 and certain input features thereof may obstruct either thumb actuator assembly 410 or 420 from view at such an angle. Then, protruding inputs, namely keycaps of key assemblies can be observed at left hand surface 303 and right hand surface 304 in addition to certain input/feedback components of auxiliary input/feedback panel 307. Auxiliary input/feedback panel 307 may be slightly recessed beneath the top surface of controller top casing 301, but may be formed from the same part/material or provided separately. Additionally, wired connection 306 may be provided, which may offer certain standardized and/or custom interfaces to computing devices, power supplies, gaming consoles, as well as their accessories and other controllers and peripherals thereof. Perhaps importantly, wired connection 306 and its proximity to either of right and left accessory clips 305a-b may enable increased cable connection security, cord management, and other features as may be described herein. In describing the remaining features of controller assembly 300, as they may relate to the left and right side elevation views of FIGS. 3C-D are illustrated. From the left view of FIG. 3C, left thumb actuator assembly 410 and those actuators protruding left hand surface 303 may be visible and from the right view of FIG. 3D, right thumb actuator assembly 420 and those actuators protruding right hand surface 304 may as well. Additionally, right and left accessory clips 305a-b can be visualized at FIGS. 3D and 3C, respectively.

Having illustrated and described controller assembly 300 from various observable angles, in at least one potentially preferred embodiment, certain benefits and features may be observed by those having ordinary skill in the art, particularly when viewing FIGS. 2-3 holistically. Additionally, optional features not illustrated herein may be inspired by such observation of FIGS. 2-3. Importantly, persons having ordinary skill in the art may further visualize these features and benefits from a review of other controller assembly 300 embodiments and Drawings thereof, e.g., FIGS. 9-10. If one having ordinary skill in the art imagines approaching controller assembly 300 at a desktop or placing it upon one's lap, and hovering their hands about each side of the center, thumbs may be naturally placed above left thumb actuator assembly 410 and right thumb actuator assembly 420. Certain benefits of thumb actuation of these assemblies are covered in greater detail with respect to the remaining Drawings, but those having ordinary skill in the art should recognize such placement of such actuation assemblies as potentially ideal to an ergonomic arrangement. Furthermore, other actuation devices may be found further distally from the center such that remaining digits may actuate keys, buttons, D-Pads, touchpads, the like, and combinations thereof, without moving thumbs from the thumb actuators, similar to operating a keyboard having a spacebar. That is, where more dexterous digits may actuate multiple buttons, the thumbs being opposedly aligned thereto can then "roll" on the surface of the thumb actuators without requiring significant thumb travel and/or dexterity. Additionally, given this design and arrangement of controller assembly 300, certain feedback components, displays, or specialized buttons may be placed about auxiliary input/feedback panel 307, which may increase visibility for lights and avoid errant button presses. With respect to optional components and alternative arrangements, for instance, left wrist rest 311 and right wrist rest 312 may feature padding or high-frictional materials to either increase comfort or aid in "locking" hand placement on each side of controller assembly 300 via minimal downward force upon a high-friction surface. Other optional example features of various aspects may include high friction materials of thumb actuator assemblies 410, 420, alternative shapes thereof, and touchpads or displays about controller top casing 301 to provide various input and informational capabilities. Importantly, the materials thereof controller assembly 300 may include a multitude of plastics, rubbers, metals, natural materials, the like, and/or combinations thereof, at least with respect to controller top casing 301 and controller bottom casing 302. In fact, many professional gamers may use rapid prototyping (e.g., 3D printing, CNC) to achieve customized materials for aesthetic and/or performance considerations, which may be tooled to be compatible with manufactured versions thereof. For example, having access to 3D files of the proposed design may enable a professional gamer or other person having ordinary skill in the art to extrude a modified or customized version out of an additive manufacturing material, or may obtain, for instance, solid aluminum sufficient to mill a compatible case to increase durability or decrease overall weight. Additionally, clear, potentially polycarbonate, versions of controller top casing 301 and/or controller bottom casing 302 may be produced enabling users to view internal components and/or place custom paper art beneath the surface, as may be understood by those having ordinary skill in the art. Additional features of controller assembly 300, including those related to thumb actuator assembly 400 and benefits over previous gaming actuators are covered in further detail below.

Figure 4A:
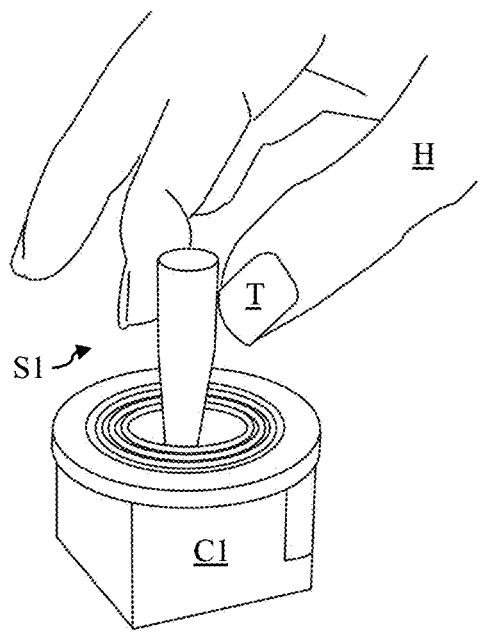
FIGS. 4A-D are perspective drawings of prior art gaming input devices.
Figure 4B:
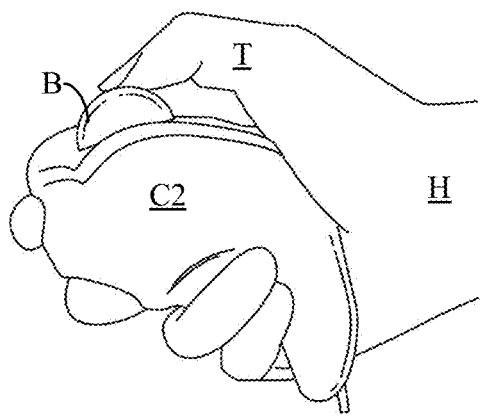
Figure 4C:
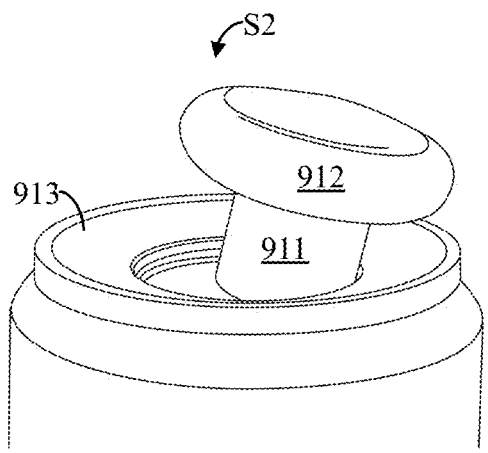
Figure 4D:
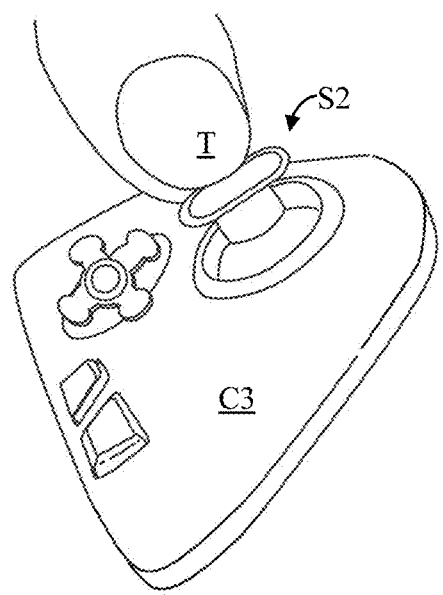

Turning to FIGS. 4A-D generally, therein illustrated are perspective drawings of various prior art gaming and computer input devices and controllers. Beginning specifically with FIG. 4A, illustrated therein is controller C1, which may feature joystick S1, being operated by hand H and thumb T. As may be observed by those having ordinary skill in the art, such a controller assembly may include further components beyond joystick S1. Joystick S1 may be or be modified to become an analog joystick or a digital joystick, each of which may function differently, at least internally, and each of which may come in many additional forms and configurations. Adapted from aviation control columns, joystick S1 may be adapted to control video games, and may feature a touch button, push button, trigger, or other similar secondary input device. Variations may also exist with regard to size and shape, but joystick S1 and variations thereof may share several common functions and features. These may generally include features such as returning to center when forces are removed, 360° articulation about the center, and x/y directional signals caused by x/y movement of joystick S1. Movement of joystick S1 may be communicated electronically when joystick S1 pivots on its base and reports its angle and direction to the device it is controlling. Controller C1 may detect the direction of joystick S1 through a variety of means, such as via use of an electronic switch, Hall Effect, strain gauge, or potentiometers. As may be recognized by those having ordinary skill in the art, analog sticks (or alternatively, thumbsticks) have become standard on controllers for video game consoles in recent decades. Such analog embodiments of joystick S1 may primarily be selected due to their ability to indicate joystick S1's displacement from its neutral position and/or central position. Such a feature may relieve software from needing to track joystick S1's position or estimate the speed at which it is moved. Many analog joystick S1 embodiments feature potentiometers configured to determine the position of joystick S1. Perhaps importantly to thumbsticks generally and to the disclosure specifically, Hall effect sensors may offer the further benefit of reduced size to accommodate joystick S1 on very small or portable devices. Turning to FIG. 4B, illustrated therein is trackball controller C3 operated by hand H and thumb T via trackball B. While those having ordinary skill in the art may recognize trackball controllers generally to come in a wide variety of configurations, trackball controllers may generally feature a smooth ball housed in a socket that allows users to control the movement of a cursor or the direction of an action within a video game. Additionally, trackballs may be found in, for instance, standard computer mice, which may be analogously operated moving the whole hand rather than the thumb alone. By rolling the ball with their fingers or thumb, users cause tracking devices within the socket (e.g., rollers, IR) to communicate movement to the controlled device. Trackballs are commonly used in applications where space is limited, such as arcade games or certain specialized tasks, and many gaming users may prefer trackball arrangements over other common directional input devices, such as joysticks and D-Pads. Importantly, since trackballs may commonly be secured within a socket, where they are able to roll freely, they may not be further secured or held internally to enable a return-to-center capability that may be standardly featured on a stick or directional pad, given those configurations described herein. Additionally important may be that trackball B may offer certain experiential, ergonomic, and other benefits when compared to operation of a thumbstick. Those skilled in the art may recognize that operation of a thumbstick, due to variations in shapes and sizes of components like handles, may require additional dexterity to operate accurately and precisely over a trackball, which may be more easily displaced, similarly to rolling a ball on a surface with your palm or a finger. In essence, the digit moving the ball can remain relatively fixed and the shapes of the digit itself may enable it to roll against trackball B over an area of the thumb, leveraging the conformational shapes of trackball B and thumb T, rather than requiring a single point of contact to travel the same distance. However, this decision then implicates the above-mentioned tradeoff regarding returning to center. Turning to FIGS. 4C-D, illustrated therein are thumbstick S2 and an exemplary controller c2 having such thumbstick S2. As may be observed, thumbstick S2 may feature generally thumbstick stem 911, thumbstick handle 912, and thumbstick surround 913. As may be observed by those having ordinary skill in the art, thumbstick handle 912 may be moved about the aperture of thumbstick surround 913 across any of 360°, using the thumb, for example. Sensors installed therein thumbstick S2 may then cause signals, which may be relevant to user gaming motions, to be sent to gaming entertainment system 120 as may be described above. Turning to FIG. 4D specifically, controller c2 may then feature, as may be common, other example inputs such as the D-Pad and keys/buttons that may be seen thereof controller c2 and can be operated using thumb T of a user.

Importantly, while many handheld versions of controller c2 may feature variations of thumbstick S2—and in fact such configuration may be standard and/or universal among modern gaming console standard controllers—few flat, keyboard, "arcade-style", or compact arcade-style controllers feature thumbsticks, but rather may feature larger handheld sticks, which require operation of an entire hand during gameplay. One feature of the disclosure may simply be the provision of such a thumbstick in a configuration which may be comfortable to users of flat and other similarly configured controller assemblies.

Figure 5:
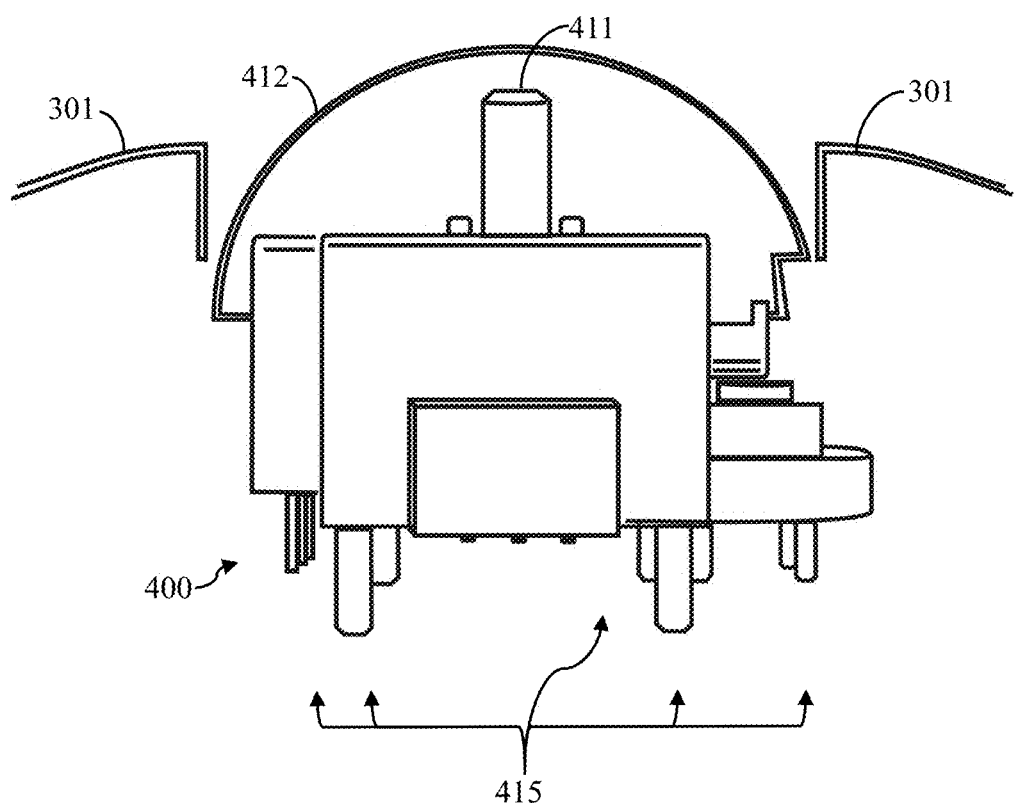
FIG. 5 is an elevation view of an exemplary embodiment of the thumb-actuated gaming input having a cross-section at the dome and top case to show the features thereof.

Turning to FIG. 5, therein illustrated is an elevation view of an exemplary embodiment of thumb actuator assembly 400 within controller assembly 300 having a cross-section taken at thumbstick dome 412 and controller top casing 301 to show the features thereof. Generally, thumb actuator assembly 400 may feature thumb actuator assembly 400 having thumbstick PCB connection 415 opposite thumbstick stem 411. Upon thumbstick stem 411 and operably combined and connected thereto may be thumbstick dome 412, which may be domed or substantially domed in shape. Importantly, as used herein domed, domed shape, and substantially domed is intended to mean and refers to any structure, surface, or form that is generally curved, convex, and rounded, resembling the exterior of a hemisphere or partial sphere. This includes, but is not limited to spherical caps (a segment of a sphere, typically with a flat circular base), ellipsoidal domes (domes that are part of an ellipsoid, featuring a more elongated curvature along one axis), parabolic domes (domes shaped like a paraboloid, where the curvature follows a parabolic path, ogival domes (domes with a pointed top, resembling the shape of an ogive or pointed arch), geodesic domes (domes composed of a network of triangles that approximate a spherical surface), hyperbolic domes, (domes shaped like a hyperboloid, where the curvature follows a hyperbolic path), conical domes (domes with a circular base that tapers smoothly to a point or apex, forming a cone-like structure, segmented domes (domes constructed from multiple curved segments or panels that collectively form a rounded shape, sometimes having ridges formed therefrom the segmentation(s)), the like and/or combinations thereof. Further to these examples, such terms may mean any shaped component which is generally convex, rounded, and elevated over its bottom surface. Importantly, while controller top casing 301 and thumbstick dome 412 may be drawn to be considerably thin, variations may exist having varying thicknesses thereof, and thumbstick dome 412 may be optimally formed in at least some embodiments having multiple parts having multiple thicknesses. Further important to considerations as they may relate to the shape and conformation of thumbstick dome 412, those having ordinary skill in the art may recognize that thumbstick dome 412 may be required to have sufficient internal clearance to accommodate the internal structures of thumb actuator assembly 400 during pivoting of thumbstick stem 411 to enable the entire potential range of motion of thumbstick stem 411. Furthermore, since variations exist among the internal features of thumb actuator assembly 400, some of which may increase and/or decrease the resistance required to cause movement of thumbstick stem 411, those having ordinary skill in the art may adjust such components and/or substitute certain components to enable such increases and/or decreases in resistance. Additionally, it may be well understood that such features may be user-adjustable via turning springs using external dials as well as other means and mechanisms. In a potentially preferred embodiment of thumb actuator assembly 400 and controller assembly 300, thumb actuator assembly 400 may be a Hall Effect thumbstick manufactured by Guangdong K-Silver Industrial Co. Ltd. having part number JH16, features of which may be more thoroughly described in at least U.S. Pat. No. 11,669,122 and application Ser. No. 17/547,272, the entire subject matter of which is herein incorporated by reference. Specifically related to this standard part number may be modifications to parts of the assembly. This may include lowering the spring rate and/or operating force of the lever where the test position is at more than 10 degrees of deflection of the lever from 120±40 gf to 80±30 gf, which may be achieved through a variety of well-known means, such as providing a new spring of the assembly or modifying the existing spring of the assembly to achieve this lowered operating force. Such modification may enable thumbstick dome 412 to travel more freely and with less user effort/force by lowering the amount of force needed to move thumbstick stem 411 across its intended range of motion. Further modifications to the assembly are further described as they may relate to thumbstick stem 411 and its shape, as well as its relation to other features of thumb actuator assembly 400, see e.g., FIGS. 7B and 8.

Figure 6:
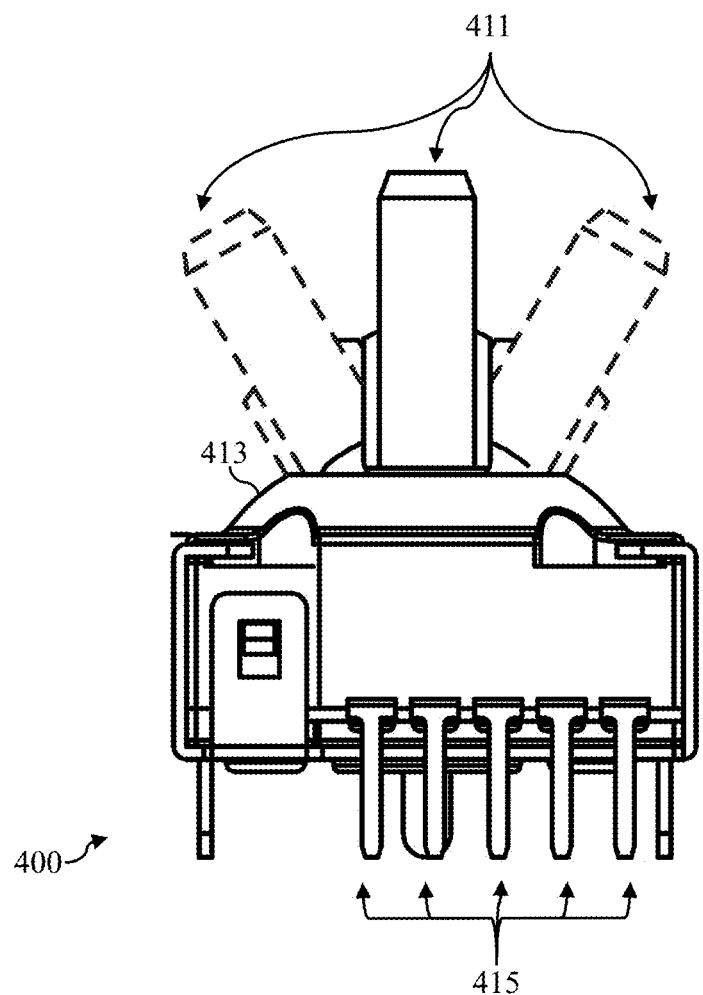
FIG. 6 is another elevation view of an exemplary gaming input component showing a range of motion.

Turning now to FIG. 6, illustrated therein is another elevation view of an exemplary thumb actuator assembly 400, without thumbstick dome 412 installed thereon, in order to show a range of motion thereof thumbstick stem 411. Notably, the standard part described above is not modified from manufacturer specifications with respect to FIG. 6, and is provided for comparison with such modifications and improvements to the assembly. As may be observed by those having ordinary skill in the art, FIG. 6 illustrates as solid lines central positioning of thumbstick stem 411 opposite thumbstick PCB connection 415, which may form a connection with various controller interface connection(s) 130 of controller assembly 300, see e.g., FIG. 1C. thumbstick stem 411 may be surrounded by thumbstick surround 413, which may limit the angular range of pivoting motion of thumbstick stem 411 while also securing it within thumb actuator assembly 400. Importantly, as illustrated, thumbstick stem 411 may be flared or feature a non-circular shape. Such a shape of thumbstick stem 4111 may cause circular and/or rotational pivoting of thumbstick stem 411 and/or a handle thereof to cause non-circular pivoting at the extreme angles shown as dotted lines. Someone skilled in the art might observe that a cylindrical thumbstick stem 411 and circular opening of thumbstick surround 413 may avoid this limitation and/or tradeoff, however, given the size of these parts and forces which may be applied to them, structural strength may be achieved using such non-cylindrical conformational shapes. An improvement to both maintain this structural integrity while providing the circular motion capability at the extreme angles is described in greater detail in relation to FIGS. 7A-B below.

Figure 7A:
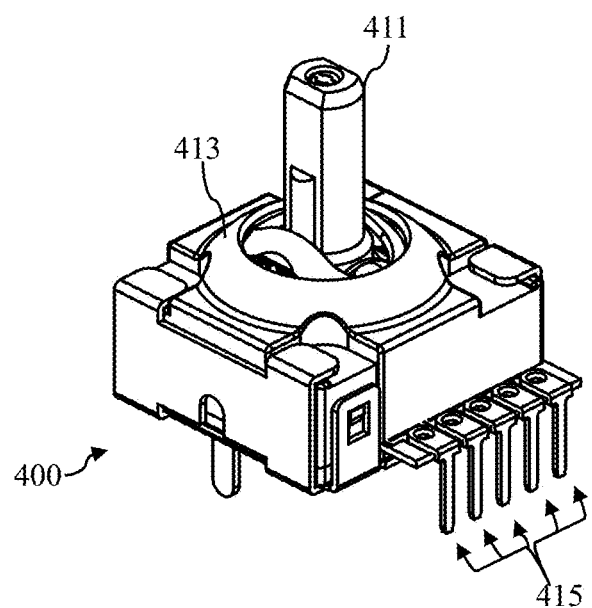
FIGS. 7A-D are perspective drawings of various components embodiments of the gaming input component.
Figure 7B:
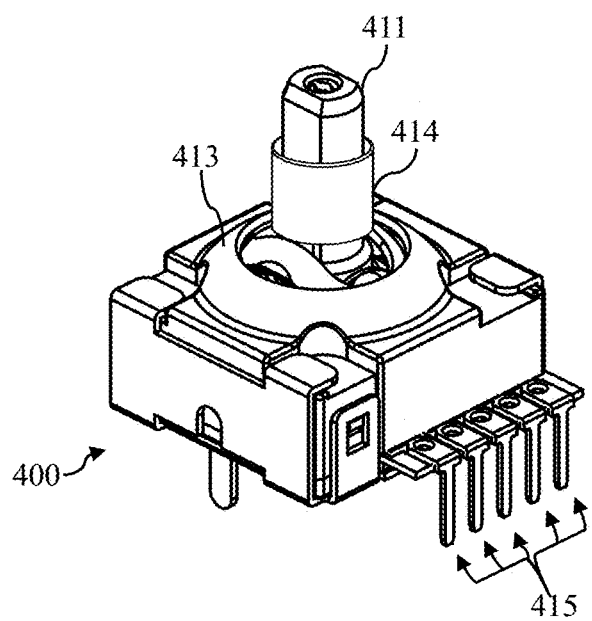

Turning to those FIGS. 7A-D, therein illustrated are two perspective drawings of embodiments of thumb actuator assembly 400, namely that which has been cited and incorporated by reference above, though the disclosure is not so limited to a single type or configuration of a thumb actuator and/or thumbstick. Generally, such thumb actuator assembly 400 may feature thumbstick PCB connection 415, which may form the electronic and structural connection with controller interface connection 130 of controller assembly 300, as may be well understood in the art. It may further feature, as it may relate to the instant disclosure, thumbstick surround 413, which may be circular in shape at an opening in order to provide a range of motion to thumbstick stem 411, which sits opposite thumbstick PCB connection 415 as may be observed herein FIGS. 7A-B. Turning specifically to FIG. 7B, therein may be observed a potentially critical component to proper functioning of thumb actuator assembly 400 in combination with thumbstick dome 412. Specifically, such range control sleeve 414 may be provided on such exemplary preferred embodiments. Range control sleeve 414 may be a hollow tube configured to surround thumbstick stem 411, perhaps tightly or loosely, and may serve to confer continuous circular pivoting range about the pivot maxima, via contact with thumbstick surround 413. Range control sleeve 414 may comprise various materials, each of which my offer certain benefits and/or tradeoffs, with regard to accomplishing such circular movement, durability, and other manufacturing and performance concerns. In a potentially preferred embodiment of thumbstick surround 413, it may comprise polyoxymethylene (POM) and have a thickness to achieve and/or ensure rotational and pivoting clearance for thumbstick dome 412 of the disclosure as may be observed in e.g., FIGS. 5 and 8. Alternative means for providing such circular clearance may be thickening of thumbstick stem 411, cylindrical shape of thumbstick stem 411, an additional surround above any flare of thumbstick stem 411, and/or non-circular surrounds to conformationally interact with thumbstick stem 411 such that circular motion can be achieved, as well as other techniques as may be known to those having ordinary skill in the art. Other materials with respect to range control sleeve 414 may include, but are not limited to polyethylene, polypropylene, polyvinyl chloride (PVC), polytetrafluoroethylene (PTFE), stainless steel, aluminum, silicone, glass, bamboo, paper, biodegradable plastics, polylactic acid (PLA), acrylonitrile butadiene styrene (ABS), nylon, other plastics, rubbers, other metals, other natural materials, the like and/or combinations and/or composites materials thereof. In a potentially preferred embodiment thereof range control sleeve 414, this material may be one that has dimensional stability, low friction, high wear resistance, high strength and stiffness, chemical resistance, low moisture absorption, and self-lubricating properties, though other considerations may also come into play and other properties may be provided as an alternative to achieve expected results.

Figure 7C:
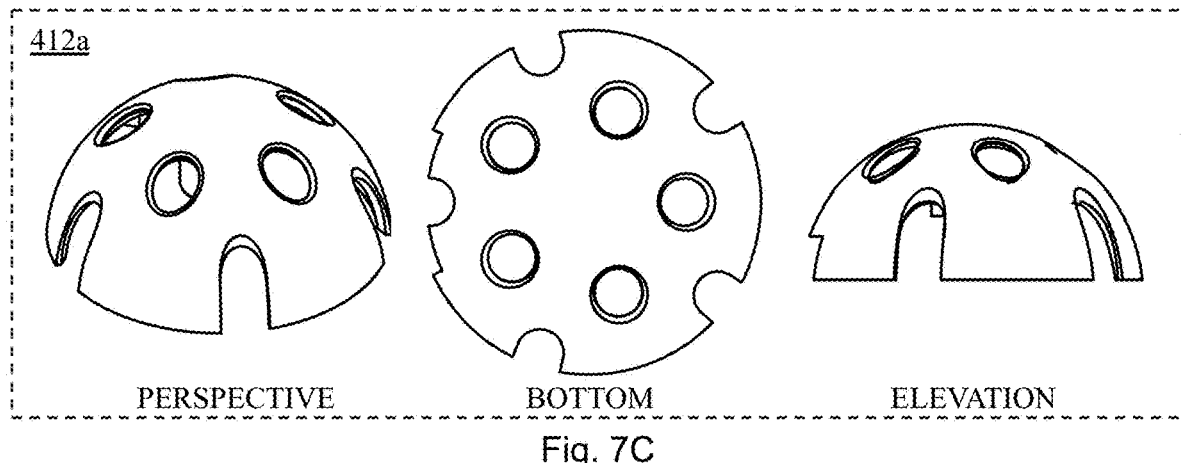
Figure 7D:
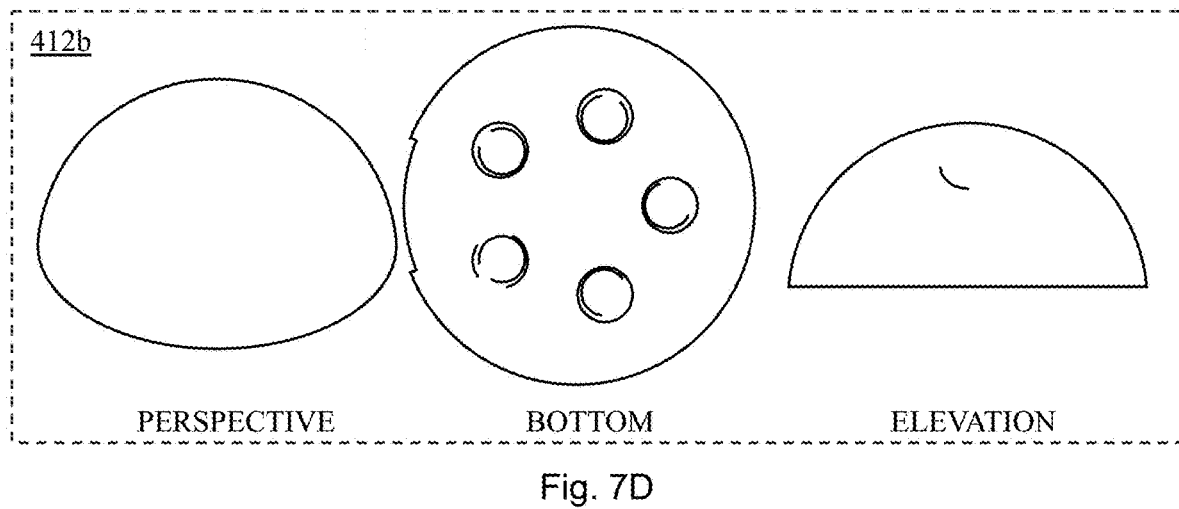

Turning now specifically to FIGS. 7C-D, an exemplary disassembled left thumb actuator assembly 410, comprising dome structure 412a and dome surface 412b, is illustrated therein via various labeled views, including perspective, bottom, and elevation thereof. Beginning with FIG. 7C, one having ordinary skill in the art may observe that dome structure 412a may comprise a substantially domed arrangement as defined within the disclosure, but having apertures to accept protrusions of dome surface 412b. Dome structure 412a may contain necessary features to further operably combine and/or connect with thumbstick stem 411 at its end. Dome structure 412a may further feature the illustrated openings at each edge to form tabs or flanges of dome structure 412a in order to further provide for necessary clearances of thumb actuator assembly 400 and its below-surface components. In the Drawing, curved flanged openings at edges, such as the 4 illustrated therein FIG. 4C, may be provided to clear obstacles of the standardized exemplary thumb actuator assembly 400 as incorporated by reference herein, and other obstacles may preferably be avoided using squared and curved, such as the left-hand opening, or only squared openings. Then, turning to FIG. 7D, dome surface 412b is illustrated having matching and/or mated protrusions to circular protrusions of dome structure 412a. While such a mated pair arrangement may offer numerous benefits, including ease and cost of assembly/manufacture, ease of replacement and durability, other assemblies, including multi-layer assemblies, one-piece thumbstick dome 412, or a single domed version, which may have a coating over thumbstick dome 412 to achieve certain frictional or aesthetic benefits. Much like dome structure 412a, dome surface 412b may be non-circular at its base to further assure avoidance of thumb actuator assembly 400 protrusions during thumbstick stem 411 and thumbstick dome 412 travel. As may be understood in the art, depending on where and how severe such obstructions may be, given a size of thumbstick dome 412, customization may be provided and variations may exist with regard to such cut-outs or flares of thumbstick dome 412 in its assembly. As may be observed by those having ordinary skill in the art when comparing dome structure 412a and dome surface 412b, thumbstick dome 412 may conform more closely to a circular base of the corresponding dome as it is further distal from thumb actuator assembly 400 in this exemplary assembly, given the incorporated by exemplary reference part mentioned above.

Figure 8:
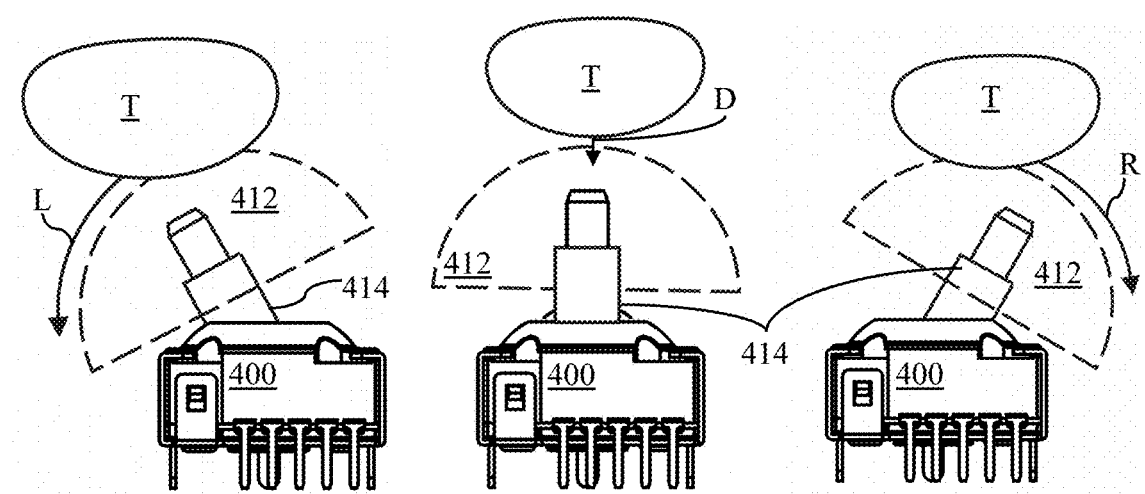
FIG. 8 is a series of elevation drawings of the gaming input component and a dome top in relation to various thumb movements.

Turning now to FIG. 8, a series of elevation drawings of thumb actuator assembly 400, including thumbstick dome 412 (which is shown transparently using dotted lines to expose areas thereunder) in relation to various thumb T movements from left force L and right force R. As illustrated, thumb actuator assembly 400 may feature various parts, which are described in greater detail above. Starting at the center, in use, thumb T may not generally contact thumbstick dome 412 to operate thumb actuator assembly 400, and during such time, thumbstick stem 411 may default to center, as may be preferred. Then, when the thumb is moved down slightly using downward force D to contact thumbstick dome 412 and perhaps preferably rolled or moved slightly toward the left, thumbstick dome 412 is proportionally moved using left force L. The reverse can then be said of the right side, utilizing right force R in a similar manner. Perhaps importantly from these views, aspects of thumbstick surround 413 and its interaction with thumbstick stem 411 via range control sleeve 414 may be more appreciated by those having ordinary skill in the art. As may be observed by comparing each embodiment of thumb actuator assembly 400, range control sleeve 414 may make contact at extreme left and extreme right movements of thumbstick stem 411. Since pivoting of thumbstick stem 411 may occur over the entire 360°, and since range control sleeve 414 may be cylindrical in shape, conforming to thumbstick surround 413, such thumbstick stem 411 and thereby thumbstick dome 412 can be pivoted circularly, despite having a flared thumbstick stem 411.

Figure 9A:
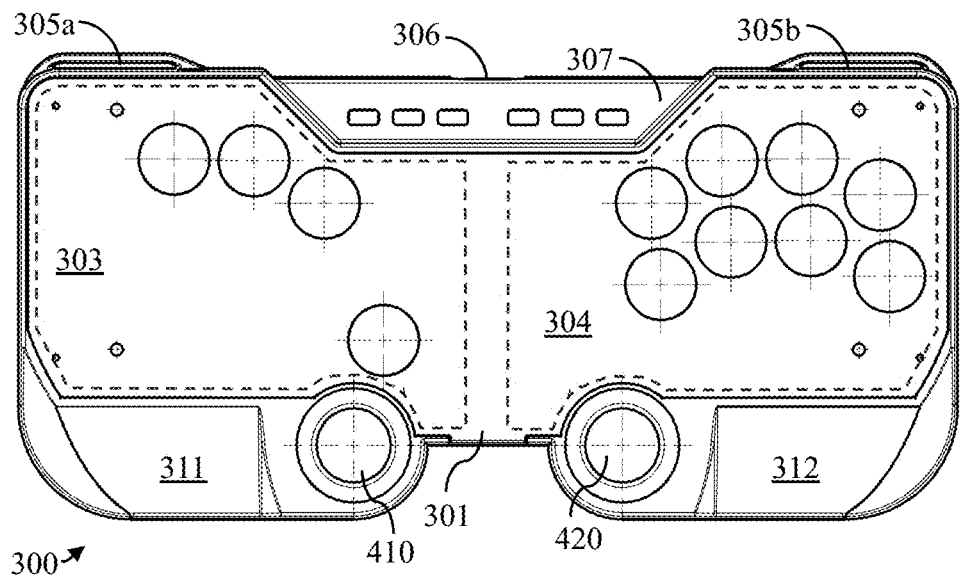
FIGS. 9A-B are top plan drawings of alternative exemplary designs and configurations.
Figure 9B:
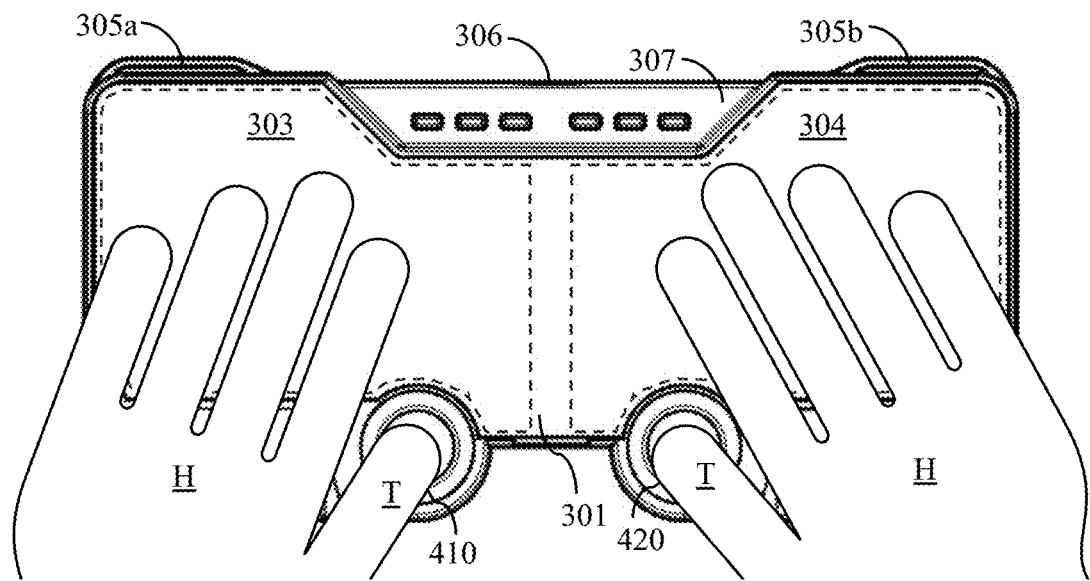

FIGS. 9A-B are top plan drawings of alternative exemplary designs and configurations of controller assembly 300. Starting specifically with FIG. 9A, illustrated therein is another embodiment of controller assembly 300, similar in structure to the embodiment shown in FIG. 2A, but with distinct differences in the inputs on left hand surface 303 and right hand surface 304. Like the previous embodiment, controller assembly 300 features controller top casing 301, with a plurality of openings that may enable user inputs to protrude from left hand surface 303 and right hand surface 304, as well as left thumb actuator assembly 410 and right thumb actuator assembly 420. Additionally, controller top casing 301 may have openings near auxiliary input/feedback panel 307 for various lights, sensors, other communication or indication features, and inputs. Structural and connection mechanisms such as screws for assembly connections 161, 162, 163, additional assembly connections, and connections to other devices, like wired connection 306 and right and left accessory clips 305a-b, may be also incorporated. Right and left accessory clips 305a-b can be utilized for tasks such as wire management, attaching the controller to a bag or organizational item, securing a lock, or carrying the controller assembly 300. In use, a user may place their left hand over the left hand surface 303 and their right hand over the right hand surface 304. The keys on left hand surface 303 and left thumb actuator assembly 410 can be operated by the fingers and thumb of the user's left hand, respectively. Similarly, the right hand can be used to operate the keys and inputs on right hand surface 304 and right thumb actuator assembly 420. While controller top casing 301 remains largely rectilinear and flat, it may incorporate various ergonomic and aesthetic contours. For instance, it includes left wrist rest 311 and right wrist rest 312, as well as other contours detailed in greater depth and artistic design details in the subsequent figures (FIGS. 10A-G). Then, with respect to FIG. 9B, left hand surface 303 and right hand surface 304 are left empty to highlight each side's versatility, in favor of hand H overlays, such that those having ordinary skill in the art may be inspired to create additional conformations, shapes, arrangements, and features as nearly any input device capable of being connected via PCB through a surface may be featured on either (and both) of right hand surface 304 and left hand surface 303, limited only by size considerations and those having ordinary skill in the art and their imaginations.

Turning now to FIGS. 10A-G, therein illustrated are perspective, plan, and elevation drawings showing all exterior shapes and surfaces of an ornamental design of controller assembly 300 of the disclosure. Overall, design considerations thereof controller assembly 300 may offer certain enhancement to aesthetics, practicality, user preference, and ergonomics, as may be immediately recognized by users and those having ordinary skill in the art. In the embodiment shown herein, as with those depicted in e.g., FIGS. 2A-B, 3A-3D, and 9A-B, many aspects may lend comfort, ergonomics, digit specialization, and efficiency during gameplay or other controller uses. The adaptability of the controller assembly 300 to various input configurations demonstrates its versatility and user-centric design.

Figure 10A:
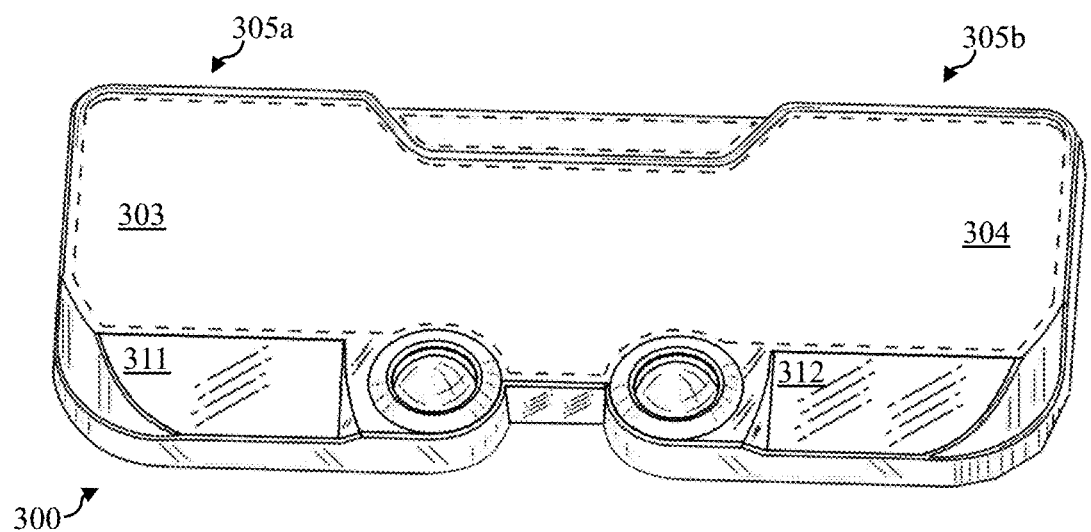
FIGS. 10A-G are top perspective drawings, top and bottom plan drawings, rear and front elevation drawings, left and right elevation drawings, respectively, having shading in order to further show the ornamental design thereof.
Figure 10B:
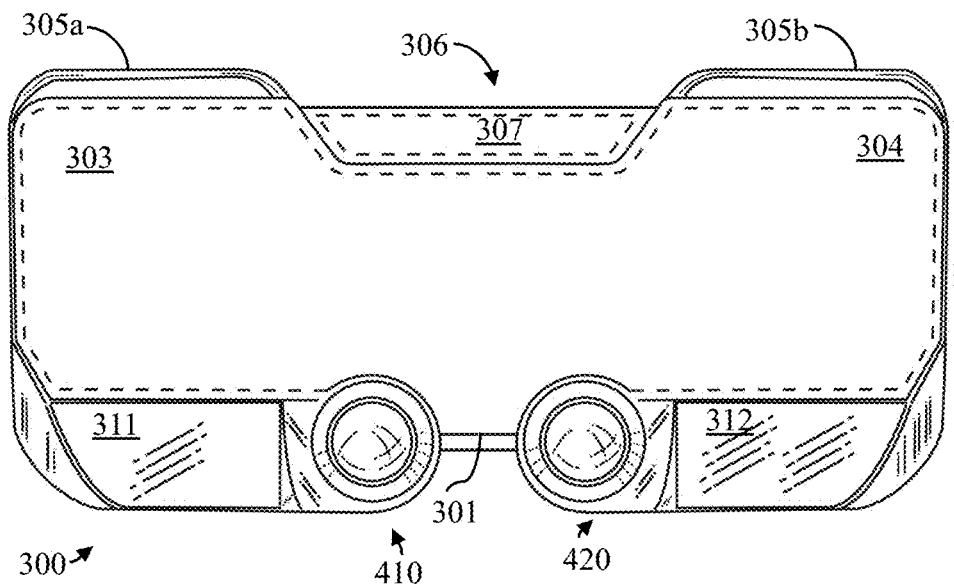
Figure 10C:
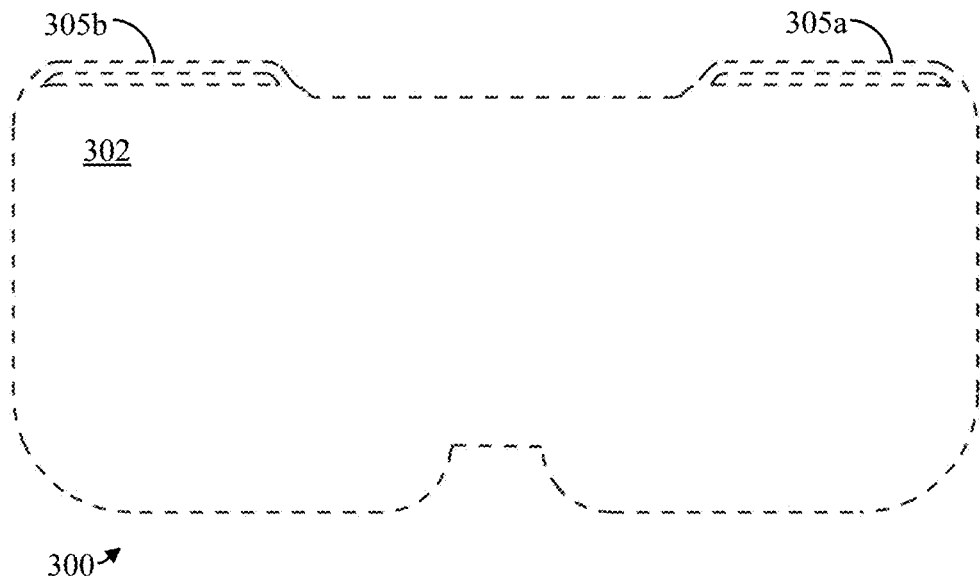

Turning specifically to FIG. 10A, therein illustrated is a perspective view of yet another embodiment of gaming controller assembly, drawn using artistic design and shading to now showcase the overall design and layout. Controller assembly 300 may feature an ergonomic shape designed to fit comfortably beneath the user's hands, as if they were at a typing surface. As described above, though left as unshaded environmental aspects of the design therein FIG. 10A, surfaces such as left hand surface 303, right hand surface 304, and auxiliary input/feedback panel 307 may act as a blank canvas, which may be customized or further developed to include and/or accommodate certain gameplay styles and/or user preferences. Such surfaces can include a variety of buttons and input and feedback components positioned to maximize accessibility and ease of use. Key elements such as directional pad(s), action buttons(s), additional thumbsticks, and additional function buttons can then be imagined to reside thereon such surfaces. Turning to those features which are thoroughly and specifically drawn with respect to shapes and contours, controller assembly 300 may feature right and left accessory clips 305a-b distal the user, whereas left wrist rest 311, left thumb actuator assembly 410, right thumb actuator assembly 420, and right wrist rest 312 may appear across the proximal edge of controller assembly 300. These components may be strategically placed to ensure intuitive and efficient control during gameplay, leveraging each digit's overall specialty as it may relate to interaction with a flat surface having inputs. One skilled in the art may recognize such a design as providing a seamless and immersive gaming experience, especially when inputs the main controller top casing 301 surfaces are designed to further accentuate such principles, by aligning with the natural contours of the user's hands as well as by providing specialized inputs catered to individual digits and their capabilities/strengths. The top plan view, as can be viewed in FIG. 10B, contains many of such same features as shown therein FIG. 10A, though a comparison thereof may reveal certain slopes (e.g., wrist rest 311, 312), curves (e.g., thumb actuator assemblies 410, 420 and each corner of controller top casing 301). Turning to FIG. 10C, illustrated therein is a bottom plan surface of controller assembly 300. It is drawn dotted to show that many considerations may be made with respect to the design and shape of controller bottom casing 302. While many may prefer a substantially flat and uniform surface, the description is not so limited. Controller bottom casing 302 may be further customized to contour a user's lap shape, to include padding or other comfortable features. Additionally, hinged clips may enable tilting or angular configuration of controller assembly 300 on a surface, as may be known in the art of keyboard manufacture. Additional features, such as lights, charging connections, vents, grilles, custom artwork, the like and/or combinations thereof may be featured thereon or therein controller bottom casing 302, and are intended to be included in the description herein.

Figure 10D:
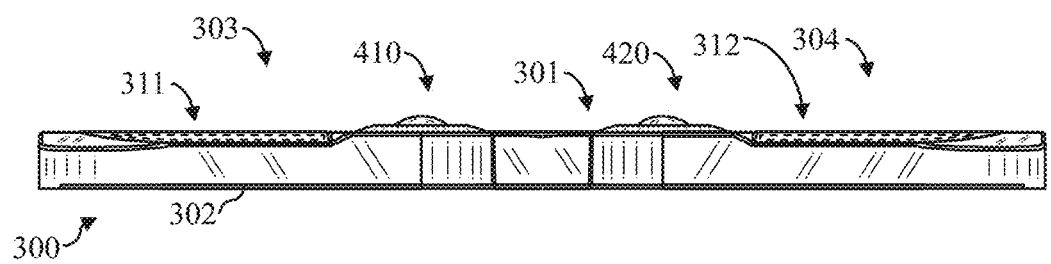
Figure 10E:
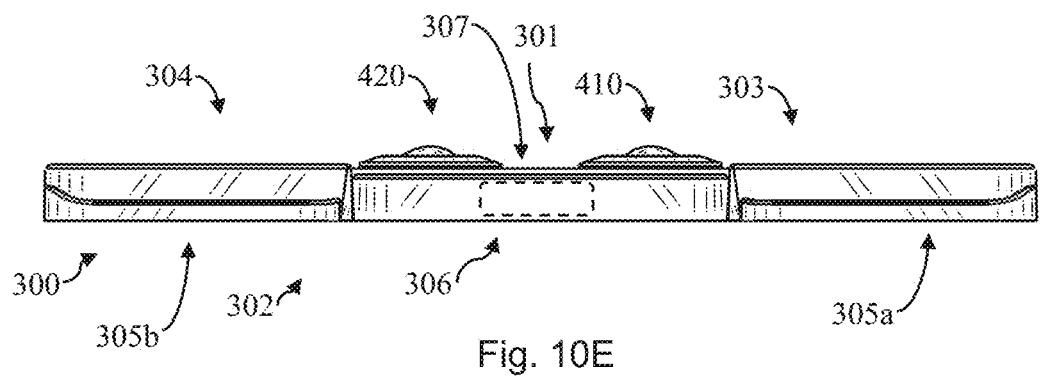
Figures 10F, 10G:
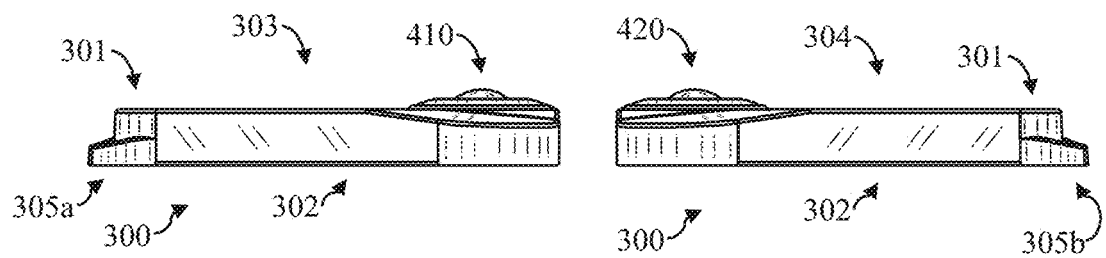

Turning to the elevation views of controller assembly 300, starting at FIG. 10D illustrates a front elevation view of controller assembly 300. This view lends focus to the front-facing or user proximal inputs and their arrangement. Again, layouts of non-thumb actuated action buttons, directional pads, additional thumbsticks, etc. are not shown, in order to instead emphasize versatility of controller assembly 300. The front elevation view may ultimately showcase the design's symmetry and balance, contributing to a visually appealing and functionally effective controller design. Additionally visible at this view may be thumb actuator assemblies 410, 420, which may crest just above thumbstick surround 413 (or controller top casing 301) to achieve further aesthetic benefits as well as the various utilitarian benefits described above. As it may relate to the rear elevation of controller assembly 300, FIG. 10E illustrated design characteristics visible distal the user. This perspective may highlight the placement of right and left accessory clips 305a-b, the many optional benefits of which are further described above. Not drawn may be the optional wired connection 306, which may be included for charging and data transfer versatility or removed in certain battery powered and wirelessly charging embodiments as may be described herein. Turning to the final design drawings therein FIGS. 10F-G, left (10F) and right (10G) views of controller assembly 300 are respectively shown therein, respectively. It can be observed again at these angles various benefits, both with regard to utility and aesthetics, of right and left accessory clips 305a-b as well as thumb actuator assemblies 410, 420 as they may relate to controller top casing 301. In combination, these elevation views of controller assembly 300 may help persons having ordinary skill in the art recognize the benefits of how thin and potentially lightweight controller assembly 300 may be, given such design and configuration. This may benefit users, making controller assembly 300 more portable and impressive to competitors. Having described the overall shape, variation, configuration, and the corresponding benefits thereof with regard to controller assembly 300, its parts, including thumb actuator assembly 400, various methods of use as well as further configurations are discussed below in relation to FIG. 11, as well as the disclosure as a whole.

Figure 11:
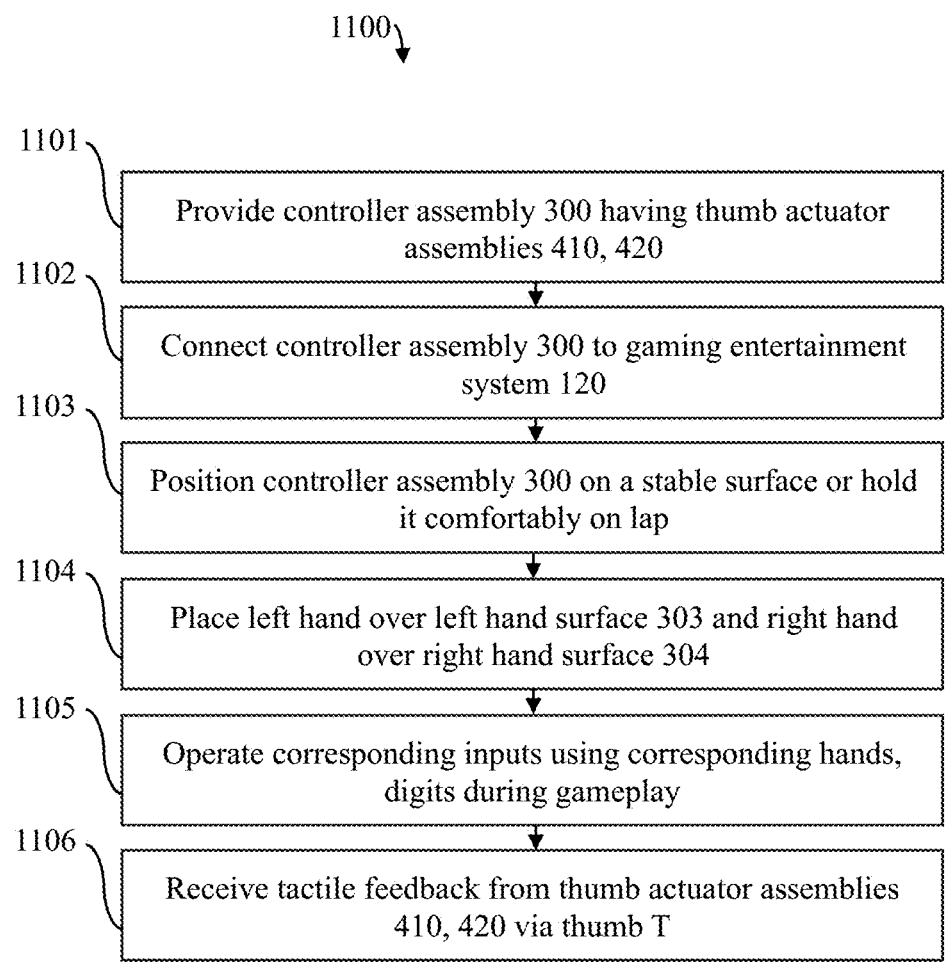
FIG. 11 is a flowchart diagram of a method of use of the gaming controller of the disclosure.

Turning to FIG. 11, therein illustrated is a method flowchart method drawing of a potentially preferred embodiment of a method of use of controller assembly 300. While such a method may be performed in such an order, the description is not so limited, and those having ordinary skill in the art may reorder such steps as may be necessary or desired to accomplish the same and/or similar results or to achieve other benefits or avoid various tradeoffs, as may be described herein. Starting at step 1101, controller assembly 300 having thumb actuator assemblies 410, 420 may be provided to a user. The user may then connect controller assembly 300 to gaming entertainment system 120 at step 1102 and place controller assembly 300 on their lap or a surface at step 1103, the steps of which may be readily reversed. Then, at step 1104, each of the users hands may be placed above controller assembly 300 as described and illustrated herein to conformationally align with various inputs of the disclosure, namely thumb actuator assemblies 410, 420, as well as other conformational features with respect to anatomical features of the hand, such as wrist rests 311, 312. At step 1105, corresponding inputs using corresponding hands and digits may be operated during gameplay, as may be described herein. Finally, users may experience certain tactile feedback from thumb actuator assemblies 410, 420 via thumb T during gameplay at step 1106, concluding exemplary method 1100.

The drawings described herein are intended to provide a general understanding of the structure of various embodiments of the disclosed device(s). The illustrations are not intended to serve as a complete description of all of the elements and features of the apparatus, product, method of use, and/or system that utilizes the structures and/or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

As contemplated herein, controller assembly 300 and various parts thereof may be manufactured in various shapes and sizes, including but not limited to shapes such as cylinders, triangular prisms, rectangular prisms, cubes, cones/funnels, the like and/or combinations thereof and all sizes and shapes by which video game users may desire. Various parts of controller assembly 300 may also be embodied in various shapes and sizes and the disclosure is not so limited to those embodied in the various embodiments disclosed and illustrated herein. To this end, by way of example and not limitation, thumb actuator assembly 400 may feature alternatively shaped thumbstick surround 413, thumbstick dome 412, thumbstick stem 411, etc. to provide certain understood results to those having ordinary skill in the art. One skilled in the art may know of many suitable materials for the purposes described herein and suitable materials not known at the time of the application may be later developed. It is therefore contemplated that controller assembly 300 may be manufactured from a variety of materials including but not limited to plastics, rubbers, metals, natural materials, fabrics, composite materials, the like and/or combinations thereof. While highly specific parts, materials, shapes, sizes, and other physical, mechanical, and electronic characteristics may be described, recited, and referenced herein (and incorporated in full), the description is not limited to any specific part, material, shape, size or other physical, mechanical, or electronic characteristic. The number of thumb actuator assembly 400 is not limited to 1 or 2 of any controller assembly 300, and may be any reasonable number in a number of configurations including but not limited to 3, 4, 5, 6, 7, 8, 9 and so on in linear, triangular, quadrangular, circular, etc. configurations. Furthermore, gameplay is not limited to any type of gaming, whether that be first person shooting games, side scrolling adventure games, 2- or 3-dimensional fighting games, role playing games, etc., or to any specific gaming style. It is further herein contemplated that modifications may be made to various embodiments of controller assembly 300 of the disclosure and the parts thereof so as to allow for accommodation to users facing disabilities, injury, fatigue, or other diminished ability to interact with controller assembly 300 and video gaming overall. Modifications may include the addition (or removal) of corresponding parts to aid in countering such deficiencies. Additionally, such modifications may allow for the simultaneous additional users to collaborate using one controller assembly 300, or to include in a portable, unified assembly, which may include components of gaming entertainment system 120 and controller assembly 300 combined. Modifications to accommodate these two or more users may include by way of example and not limitation, installation of thumb actuator assembly 400 into an arcade cabinet or tabletop gaming surface. As described above in relation to thumbstick dome 412, variations of domes exist as may be defined herein, allowing for variations in the tactile feedback and activation force required by a user to initiate and conduct a movement of thumbstick dome 412. Other inputs may employ switches or any other type of sensor, providing flexibility in design and functionality, to include keyboard keys, buttons, touch sensors, D-Pads, the like and/or combinations thereof. In some embodiments, a stick-shaped outer extension of thumbstick dome 412 (dome surface 412*b* or dome structure 412*a*) could be inserted in place of thumbstick dome 412 described above, offering an alternative method of input to a dome. Additionally, thumbstick dome 412 may be provided having a center divot, providing another variations for user interaction. As described herein, analog or digital substitutions can be made for both thumb actuator assembly 400 and other various inputs of controller top casing 301, enhancing the versatility of the input device and accommodating various user preferences and/or desires. This may then further increase the already wide range of input technologies, to include sensor technologies which may be integrated to controller assembly 300, adapting it to different user preferences and incorporating future technological advancements. Specifically as it relates to the operation, assembly, and hard/software configuration of thumb actuator assembly 400, while ordinary and potentially preferred use(s) of thumb actuator assembly 400 may be to provide directional control (i.e., L/R/U/D) to an interactive character, vehicle, etc. during gameplay, the description is not so limited. It has been well known in the art for decades that joystick functions generally can be substituted with buttons, D-Pads, or keys such that gameplay ordinarily "requiring" a standard console controller thumbstick can be reprogrammed or even rewired to support certain "all button" arrangements for players who prefer pressing buttons to control gameplay movement. Such benefits are both well-known and well described in the art, and such arrangements may even have widespread enthusiastic gaming community support, adoption, and/or enthusiasm. However, the reverse is true: joysticks can implicate gameplay actions other than movement and actually replace buttons. For example, hardware and/or software reconfiguration could enable an "UP" input from the joystick to indicate to the game that the "JUMP" button has been pressed, as well as any other known or future gaming input signal substation. Furthermore, as may be generally observed by those having ordinary skill in the art, many of the aspects, parts, and/or features of controller assembly 300 and various devices as may be herein disclosed, may be comprised of one or many parts, each in turn each possibly having sub-parts. Additionally, some features and/or parts of the disclosure may be formed of one single part, performing the task(s) of multiple parts, which by way of example and not limitation, may include a cord which provides both power and data transmission, like a USB port which may accept power and receive/broadcast data over a single cord.

The foregoing description and drawings comprise illustrative embodiments of the present disclosure. Having thus described exemplary embodiments, it should be noted by those ordinarily skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments of the disclosure will come to mind to one ordinarily skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein, but is limited only by the following claims.

The invention claimed is:

1. A gaming controller assembly comprising:
   a housing containing a power supply, a processor, a gaming device interface, a memory, and an at least one printed circuit board configured to receive at least a first circuit component, a second circuit component, and a third circuit component;
   said housing comprising at least a controller top casing having a plurality of apertures corresponding to at least said first, second, and third circuit components, said controller top casing having a left portion and a right portion;
   an at least one right-handed control protruding through an at least one of said plurality of apertures on said right portion and installed thereon said first circuit component;
   an at least one left-handed control protruding through an at least one of said plurality of apertures on said left portion and installed thereon said second circuit component;
   an at least one thumb actuator of said right portion or said left portion, the thumb actuator comprising:
   a stem having a first end and a second end;
   a joystick assembly having a pivot connected to said stem at said first end opposite a connection to said third circuit component;
   a substantially spherical-domed handle having a connection with said stem at said second end;
   wherein said substantially spherical-domed handle is configured to partially protrude said controller top casing through one of said plurality of apertures.

2. The gaming controller assembly of claim 1, further comprising a range control sleeve, said range control sleeve comprises a cylindrical tube having a circumference sufficient to surround said stem and a length shorter than a distance from said first to said second end.

3. The gaming controller assembly of claim 2, wherein said range control sleeve is made from an at least one material from a group of materials, the group consisting of polyacetal, polyoxymethylene, thermoplastic, polybutylene terephthalate, polypropylene, acetal homopolymers, and acetal copolymers.

4. The gaming controller assembly of claim 1, wherein said joystick assembly is a Hall Effect joystick having a return-to-center configuration.

5. A gaming controller assembly of claim 1, wherein said at least one thumb actuator is a left thumb actuator and a right thumb actuator, said left and right thumb actuators connected to said third circuit component of said printed control board, and said handle of said left thumb actuator partially protrudes said controller top casing through a first aperture of said plurality of apertures on said left portion and said handle of said right thumb actuator partially protrudes said top controller casing through a second aperture from said plurality of apertures on said right portion.

6. The gaming controller assembly of claim 5, wherein said controller top casing is raised about said first and said second apertures.

7. The gaming controller assembly of claim 5, wherein a raised surround is installed thereon said controller top casing and configured to surround at least one of said first and said second apertures.

8. The gaming controller assembly of claim 3, wherein said handle is non-circular at a base, having at least one portion tabbed to avoid said joystick assembly during a travel maxima.

9. The gaming controller assembly of claim 5, wherein said right hand and said left hand control are selected from a group of controls, the group consisting of a D-Pad, a thumbstick, a button, a key assembly, a touchpad, a trigger, a trackball, an isometric pointing device, and a touchscreen.

10. The gaming controller assembly of claim 5, wherein the handle is ridged.

11. The gaming controller assembly of claim 5, wherein the handle is rubberized.

12. The gaming controller assembly of claim 4, wherein the joystick assembly further comprises a biasing element, said biasing element is configured to provide an operating force of a lever of said joystick assembly.

13. The gaming controller assembly of claim 12, wherein said operating force is less than 120 g.

14. A gameplay method comprising:
   providing a gaming controller assembly configured to interact with a gaming entertainment computing device, the gaming controller assembly comprising:
   a housing comprising a top casing having apertures and containing an at least one printed circuit board configured to at least transmit signals to said gaming computing device and further configured to receive a plurality of circuit components;

a right portion having right hand controls and a left portion having left hand controls, said right and left hand controls protrude through said apertures and connect to said printed circuit board via said plurality of circuit components;

an at least one thumb actuator of said right portion or said left portion, the at least one thumb actuator comprising:

a stem having a first end and a second end;

a joystick assembly having a pivot connected to said stem at said first end opposite a connection to an at least one of said circuit components; and a substantially spherical-domed handle having a connection with said stem at said second end;

wherein said substantially spherical-domed handle is configured to partially protrude said controller top casing through one of said apertures;

placing a left hand above said left portion and a right hand above said right portion wherein fingers of said left hand are proximate said left hand controls and fingers of said right hand are proximate said right hand controls and an at least one thumb of either said left or right hand is proximate said at least one thumb actuator.

15. The method of claim 14, further comprising the steps of contacting said at least one thumb actuator with said at least one thumb and rolling said at least one thumb on said at least one thumb actuator.

16. The method of claim 15, wherein said at least one thumb actuator is a left thumb actuator of said left portion and a right thumb actuator of said right portion.

17. The method of claim 16, wherein said at least one thumb actuator further comprises a range control sleeve, said range control sleeve comprises a cylindrical tube having a circumference sufficient to surround said stem and a length shorter than a distance from said first to said second end.

18. The method of claim 15, wherein said joystick assembly is a Hall Effect joystick having a return-to-center configuration.

19. The method of claim 15, wherein said handle is rubberized.

20. The method of claim 15, wherein said handle is a first structural dome covered by a second dome.

* * * * *